US012627182B2

(12) United States Patent
Denkmann et al.

(10) Patent No.: US 12,627,182 B2
(45) Date of Patent: May 12, 2026

(54) MOTOR APPARATUS AND MOTOR

(71) Applicant: Minebea Mitsumi Inc., Nagano (JP)

(72) Inventors: Volker Denkmann, Donaueschingen (DE); Helmut Schneider, Zimmern ob Rottweil (DE)

(73) Assignee: Minebea Mitsumi Inc., Nagano (JP)

( * ) Notice: Subject to any disclaimer, the term of this patent is extended or adjusted under 35 U.S.C. 154(b) by 171 days.

(21) Appl. No.: 18/494,966

(22) Filed: Oct. 26, 2023

(65) Prior Publication Data

US 2024/0171021 A1 May 23, 2024

(30) Foreign Application Priority Data

Oct. 27, 2022 (DE) .......................... 102022128575.8

(51) Int. Cl.
| | |
|---|---|
| *H02K 1/22* | (2006.01) |
| *H02K 1/02* | (2006.01) |
| *H02K 7/08* | (2006.01) |
| *H02K 7/116* | (2006.01) |

(52) U.S. Cl.
CPC ................ *H02K 1/22* (2013.01); *H02K 1/02* (2013.01); *H02K 7/085* (2013.01); *H02K 7/116* (2013.01)

(58) Field of Classification Search
CPC . H02K 7/116; H02K 1/22; H02K 1/28; H02K 7/003; H02K 5/04; H02K 1/20
USPC ...................................................... 310/261.1
See application file for complete search history.

(56) References Cited

U.S. PATENT DOCUMENTS

| | | | |
|---|---|---|---|
| 2003/0168925 A1 | 9/2003 | Bernreuther et al. | |
| 2015/0340927 A1* | 11/2015 | Maiwald | H02K 7/116 |
| | | | 475/149 |

FOREIGN PATENT DOCUMENTS

| | | | |
|---|---|---|---|
| DE | 10152151 A1 | 5/2003 | |
| DE | 102013105964 A1 * | 12/2014 | H02K 5/1672 |

OTHER PUBLICATIONS

English Translation of DE102013105964A1 (Year: 2014).*
Office Action dated Sep. 29, 2023 issued for corresponding German Patent Application No. 102022128575.8 (and English translation).

* cited by examiner

*Primary Examiner* — Terrance L Kenerly
*Assistant Examiner* — Theodore L Perkins
(74) *Attorney, Agent, or Firm* — Posz Law Group, PLC

(57) ABSTRACT

A motor apparatus, in particular a BLDC motor apparatus, having a rotation axle and a rotor, which includes a base body and which is supported on the rotation axle in a first region and in at least one second region in a manner rotatable relative thereto, wherein a gear element of the rotor is at least arranged in part in the first region.

To provide a generic motor apparatus with improved properties in view of a design and a rotor support, it is suggested that the rotor comprises a hollow space about the rotation axle in an intermediate region between the first region and the second region.

12 Claims, 15 Drawing Sheets

V–V

MOTOR APPARATUS AND MOTOR

CROSS REFERENCE TO RELATED APPLICATION

This application is based on and incorporates herein by reference German Patent Application 10 2022 128 575.8, filed on Oct. 27, 2022.

STATE OF THE ART

The invention relates to a motor apparatus and to a motor.

Motor apparatuses comprising rotors are already known from the state of the art, all of which include a bearing region to provide support on a rotation axle, wherein the bearing region extends along the entire longitudinal extension of the rotor parallel to the rotation axle. Moreover, rotors are known, which include two separate bearing regions for support on the rotation axle, wherein at least in one region of the two regions a ball bearing and/or at least in the other region of the two regions a bearing disc formed of metal is arranged.

It is the object of the invention, in particular, to provide a generic motor apparatus with improved properties with respect to a design and a rotor support. The object is achieved according to the invention.

ADVANTAGES OF THE INVENTION

The invention is based on a motor apparatus, in particular a BLDC motor apparatus, comprising a rotation axle and a rotor, which includes a base body and which is supported on the rotation axle in a first region and in at least a second region in a manner rotatable relative thereto, wherein a gear element of the rotor is at least partially arranged in the first region.

It is suggested that the rotor comprises a hollow space about the rotation axle in an intermediate region between the first region and the second region.

Such an embodiment can help improve a design and a rotor bearing on a rotation axle. Moreover, efficiency with respect to costs, material, product, manufacturing and/or recycling efficiency can be improved. Furthermore, a design of a rotor can be provided that is particularly cost-effective and/or material-saving.

Preferably, the motor apparatus is a part, in particular a subassembly of a motor. It would also be conceivable for the motor apparatus to form the entire motor. The motor apparatus can be an electronically commutated motor apparatus. In particular, the motor apparatus is formed as a BLDC motor apparatus. Advantageously, the motor is an electronically commutated electric motor. Electronically commutated electric motors are commonly referred to as "brushless DC motors" (BLDC motors), whereas they are, however, AC motors, in particular synchronous motors, where commutation is achieved by means of electronic semiconductor components, for example MOSFETs and/or the like, instead of carbon brushes, as is the case with brushed DC motors.

The motor is provided to convert electrical energy into mechanical energy, in particular motion energy. In particular in at least one operating state, advantageously the already mentioned operating state, the motor interacts with at least one external structural unit, in particular drives the external structural unit. The external structural unit can be, for example, a gear or the like for the transmission of mechanical energy to at least one further structural unit. For example, the further structural unit could be a door handle, which is able to be mechanically unlocked and/or locked by means of the motor. The further structural unit can be any component deemed suitable to the person skilled in the art in the context of the present invention. Preferably, in the operating state, the motor is arranged in a housing unit formed separately from the motor. Advantageously, the external structural unit and/or at least the further structural unit is arranged on and/or within the housing unit. The external structural unit and/or at least the further structural unit can also be part of the housing unit and can form a subassembly of the housing unit.

The motor can be manufactured and/or produced independently from the housing unit, for example by the same or different companies. In particular, the motor is able to be installed in the housing unit at a later time, in particular after the motor and the housing unit have each been manufactured separately. Advantageously, the housing unit comprises at least one bearing region specially provided and/or formed for the motor, in particular as a function of shape, size and/or configuration of the motor, wherein the motor can be installed in the housing unit and/or can be positioned within the housing unit. Preferably, in the operating state and at least in an assembled state, the motor is supported and/or arranged and/or positioned in the bearing region within the housing unit. In particular, in the assembled state, the motor apparatus is supported and/or arranged and/or positioned within the housing unit.

Preferably, in the operating state and in the assembled state, the rotor is supported and/or arranged in the bearing region rotatably about the rotation axle. Particularly preferably, in the operating state, the rotor is rotatably supported within a stator. Preferably, the motor apparatus comprises the stator. The stator can include a rotor receiving region. In the operating state, the rotor can be rotatably arranged and/or supported within the rotor receiving region. In particular, the stator completely surrounds the rotor in the circumferential direction. Advantageously, in the operating state the rotor is arranged at least in sections, and preferably completely, at a distance to the inside, in particular an inside circumferential surface of the stator for contact-free rotation relative to the stator.

In particular, the rotor is provided to be rotatably driven about the rotation axle within the rotor receiving region of the stator. Preferably, the stator is provided to provide an alternating magnetic field to interact with at least one magnetic component of the rotor, in turn to drive the rotor. By energizing the stator and the associated production of alternating electromagnetic fields, the rotor is able to rotate within the stator in the operating state.

In particular, the first region and the second region, in which the rotor is rotatably supported about the rotation axle, form a first bearing region and a second bearing region of the rotor. Preferably, the first region and the second region extend at least in part, preferably completely, about the rotation axle in the inner circumferential direction of the rotor. The first region and the second region can each be formed as circular disc-shaped regions extending about the rotation axle. The first region can be situated at a first end of the rotor or can form the latter at least in part. The second region could be situated at a central portion of the rotor, which is different from a second end of the rotor, or can form the latter at least in part. Preferably, the second region is situated at the second end of the rotor or forms the latter at least in part. The first end of the rotor and the second end of the rotor can form opposite ends of the rotor as viewed along the rotation axle. Preferably, the intermediate space of the rotor extends completely from the first region to the second region. In particular, the hollow space extends radially about the rotation axle. The rotation axle can be arranged in a contactless manner to the rotor within the intermediate space. In addition to the first region and the second region, the rotor could also include additional bearing regions for support relative to the rotation axle. Particularly preferably, the rotor is only supported in the first region and the second region on the rotation axle in a manner rotatable relative thereto.

Advantageously, the gear element is formed as a driving gear which, in the operating state, is provided for transmitting a torque. In the assembled state, the gear element can be connected, for example can mesh, with the external structural unit formed, in particular, as a gear. The external structural unit can be a driven gear, which is drivable by the gear element. The gear element could have a smaller diameter, in particular a rolling circle diameter, that is smaller than the external structural unit, in particular the driven gear. A diameter of the external structural unit could be at least 10%, advantageously at least 30%, preferably at least 50% and particularly preferably at least 60% larger than the diameter of the gear element.

In the present document, numerals, such as "first" and "second" which precede certain terms, only serve the purpose of differentiating between method steps and/or objects and/or to achieve associations between objects amongst each other, and do not imply any overall number and/or hierarchical order of the object and/or the method steps present. In particular, a "second" object and/or method step does not necessarily imply the presence of a "first" object and/or method step. Furthermore, "provided" is to be understood here and in the following to mean specially programmed, configured and/or equipped. That an object is provided for a particular function is to be understood to mean that the object fulfils and/or executes this particular function in at least one application and/or operation state.

Further, it is suggested that the base body is supported on the rotation axle in the first region in a manner rotatable relative thereto, and it is integrally formed with the gear element. This can help to further optimize in particular simplify the construction. This can also help to provide a particularly efficient and compact design of a rotor.

The base body can extend in the first region and at least partially, preferably completely, along the intermediate region. In particular the first region, in particular the first bearing region, is completely formed by the base body. Advantageously, the base body is at least partially in one piece, in particular is integrally formed. Particularly preferably, the base body is entirely integrally formed. "In one piece" is understood to mean in the present document, at least adhesively connected, for example by means of an adhesive process, an multi-component injection molding process and/or welding process and/or any other process deemed suitable by the person skilled in the art. Furthermore, "integrally formed" is understood to mean made in a single piece. Preferably, this single piece is made from a single blank, one substance and/or one casting, particularly preferably in an injection molding method, in particular a one- and/or multi-component injection molding method, and/or in a punching method and/or in a sheet bending process and/or in a printing process, for example a 3-D printing process and/or by means of thermoforming and advantageously by means of a deep drawing process and/or any other method and deemed suitable by the person skilled in the art from the single blank.

The base body could be formed at least in part, at least largely or entirely from a mineral, for example ceramic, or a renewable material and/or a composite material. Furthermore, it is suggested that the base body is formed at least largely of a plastic material. This can help to provide a particularly cost- and/or material-efficient design of a rotor.

The plastic material can be a thermoplastic material. Particularly preferably, the plastic material is a sliding-optimized plastic, such as polyphthalamide (PPA), or polytetrafluoroethylene (PTFE). The plastic used can have excellent sliding properties at a low coefficient of friction and/or excellent resistance against chemical substances and solvents. In particular, the plastic used has high strength, wear resistance and/or heat resistance. The term "largely" in the present document, is intended to mean at least 55%, advantageously at least 65%, preferably at least 75%, particularly preferably at least 85% and particularly advantageously at most 95% of the surface and/or volume and/or mass percentage.

To improve efficiency with respect to a material and/or manufacturing cost efficiency and/or work or production efficiency, and to reduce overhead during production of a rotor, it is suggested that the base body is formed as an injection molded part. The rotor can include at least one magnet, preferably at least one permanent magnet. Advantageously, the rotor includes a plurality of, in particular at least two, magnets, in particular at least three permanent magnets, which are arranged on the outside of the rotor in the circumferential direction. The magnet can be arranged on the base body. Preferably, the magnet and the base body are at least partially in one piece, possibly at least partially integrally formed. The magnet can be multi-component injection molded onto the base body.

It is conceivable, in the intermediate space, for a radial distance of the base body to the rotation axle to be at least essentially constant. Furthermore, it is suggested, however, that the base body has a plurality of regions in which a radial distance of the base body to the rotation axle varies. This helps to provide uniform material thickness of a base body as viewed along a rotation axle. This achieves a reduction of distortions and/or stresses within the material of the base body during the cooling process in the manufacturing process of a rotor. Moreover, material can be saved and efficiency, with respect to cost, material, product, manufacturing and/or recycling efficiency can be further improved.

In particular, the above-mentioned "plurality of regions" are arranged within the intermediate region. Preferably, the radial distance is increased, in particular in a stepwise manner, from the first region to the second region. The radial distance can also continuously increase from the first region to the second region. Advantageously, there is a Y-shaped increase of the radial distance from the first region to the second region. Alternatively, it is also conceivable for the radial distance to be decreased, in particular in a stepwise manner, from the first region to the second region.

When an extension of the gear element along the rotation axle is greater than an extension of the first region along the rotation axle, during a cooling process during manufacture of a rotor, a uniform diameter of a rotation axle bearing can be created in a first region for supporting the rotor on a rotation axle. This in turn can improve the design.

The extension of the gear element along the rotation axle can be at least 5 mm, advantageously at least 5.5 mm, preferably at least 6 mm long. Correspondingly, the extension of the first region along the rotation axle can be at least 4.8 mm, advantageously at least 5 mm, preferably at least 5 mm long. The difference between the extension of the gear element and an extension of the first region can be at least 1 mm, advantageously at least 2 mm and particularly preferably at least 5 mm.

To ensure a uniform diameter of a rotation axle bearing for supporting the rotor on a rotation axle in a first region during manufacture of a rotor, in particular, during a cooling process after shaping a base body of a rotor and therefore to reduce or to alleviate distortion or shrinkage of material of the base body, it is suggested for the base body of the rotor to have a greater material thickness in the first region than in a third region immediately adjacent to the first region.

Advantageously, the third region is immediately adjacent to the first region without any further intermediate regions and/or sections of the rotor. In the first region, the rotor can have a material thickness of at least 2 mm, in particular at least 2.5 mm, advantageously at least 3 mm and particularly advantageously at least 4 mm. The material thickness in the third region can be at least 1.8 mm, advantageously at least 2 mm, preferably at least 2.5 mm and particularly preferably at least 3 mm. Preferably, the base body has uniform material thickness in the first region as viewed along the rotation axle, in particular, in the first bearing region. Preferably, the third region is part of the intermediate region. In particular, the third region corresponds to exactly that portion of the rotor, advantageously of the base body, which makes and/or forms the difference between the extension of the first region and extension of the gear element. The material thickness of the rotor, in particular of the base body, can increase in a fourth region along the rotation axle immediately adjacent to the third region along the rotation axle. The fourth region can extend on a side of the third region opposite the first region. The material thickness of the rotor in the fourth region can be smaller or preferably larger than in the first region.

In a further aspect of the invention, which can be, in particular, viewed both independently and in combination with the remaining aspects of the invention, it is suggested that a first sliding contact point of the rotor with the rotation axle in the first region and a second sliding contact point of the rotor with the rotation axle in the second region are each formed of a plastic material. This helps to optimize the design of the rotor and efficiency, with respect to cost, material, product, manufacturing and/or recycling efficiency. Furthermore, a particularly cost-effective and/or material-saving configuration of the rotor can be provided. Furthermore, other types of material other than plastic material, such as metal, can be dispensed with for the configuration and/or manufacture of sliding contact points.

In particular, the rotor is supported on the rotation axle in a sliding fashion at the first sliding contact point and at the second sliding contact point. Advantageously, the first sliding contact point extends only in the first region. In particular, the second sliding contact point only extends in the second region. Preferably, the first sliding contact point is a first sliding contact surface of the rotor and the second sliding contact point is a second sliding contact surface of the rotor. It is conceivable that the rotor, in particular the base body, is supported on the rotation axle at at least one of the sliding contact points in direct contact and directly contacts the rotation axle at least in portions. Preferably, a lubricant is arranged and/or inserted between the rotor and the rotation axle at the first sliding contact point and on the at least second sliding contact point. The lubricant can be, for example, oil, grease or any other lubricant deemed suitable by the person skilled in the art. Preferably, the plastic of the first sliding contact point and the second sliding contact point is the above-mentioned sliding-optimized plastic material.

The base body can form the first sliding contact point in the first region. Furthermore, it is suggested that the rotor includes a bearing element formed separately from the base body, which includes the second sliding contact point. This helps to further optimize a design and to simplify the configuration of the rotor bearing. In particular, the bearing element forms the second sliding contact point. The bearing element can be a bearing disc. Advantageously, the bearing element is radially arranged about the rotation axle.

It is also suggested, that the bearing element is at least largely made of a plastic material. This can further improve efficiency, with respect to a cost, material, product, manufacturing and/or recycling efficiency. Preferably, the bearing element and the base body are of the same plastic material. In particular, the plastic material is the above-mentioned sliding-optimized plastic material.

Furthermore, it is suggested that the base body and the bearing element are connected to each other at least in a form-fitting manner. This can provide secure, long-lasting and/or solid design for supporting the rotor on a rotation axle.

In particular, the bearing element can be clip-inserted into the base body. The bearing element can be connectable with the base body by means of a connector. The bearing element can be snap-engaged in the base body. The bearing element can have a boss for connection with the base body at least in parts and preferably completely in the circumferential direction. The base body can have a recess in the second region at least in parts or completely in the circumferential direction. In particular, the recess is a recess corresponding to the boss. In an assembled state of the bearing element, the boss can engage the recess. Preferably, during manufacture of the rotor, the bearing element is connected to the base body, in particular is installed in the base body, after separate manufacture of the base body and the bearing element.

To provide particularly strong, secure and/or solid construction with respect to an arrangement of a bearing system in a base body, it is suggested that, in an assembled state, the bearing element is fixed on the base body in a manner resistant to pressure.

In particular, the assembled state is the above-mentioned assembled state. It is also conceivable that the bearing element is separable and/or releasable and/or removable from the base body in a non-destructive manner. Preferably, the bearing element, in the assembled state, can only be separated and/or released and/or removed from the base body by destructive means. In the assembled state, the bearing element can lie in full surface contact against the base body in the circumferential direction.

In addition to fixing the bearing element on the base body by means of a form-fitting connection, frictional and/or adhesive connections could also be provided. In addition to the form-fitting connection, the bearing element could also be connectable to the base body, for example, by means of a snap connection and/or a rotary connection and/or a threaded connection and/or an adhesive gluing connection and/or a welding connection and/or a melt connection. This optimizes fixing and/or securing of the bearing element to the base body and a service life of the fixing and/or securing can be increased.

The motor apparatus and/or the motor are not to be limited to the above-described application and embodiment. In particular, to fulfil a functioning mode described herein, the motor apparatus and/or the motor could have a number of individual elements, components, units and method steps different from the number mentioned here.

Moreover, with respect to the ranges of values given in the present document, the values lying within the limits stated should also be regarded as disclosed and as able to be used at will.

DRAWINGS

Further advantages can be derived from the following description of the accompanying drawings. In the drawings an exemplary embodiment of the invention is shown. The drawings, the description and the claims comprise numerous features in combination. The person skilled in the art will suitably also view the features in isolation and will recombine them in further suitable combinations.

DESCRIPTION OF THE EXEMPLARY EMBODIMENT

Figure 1:
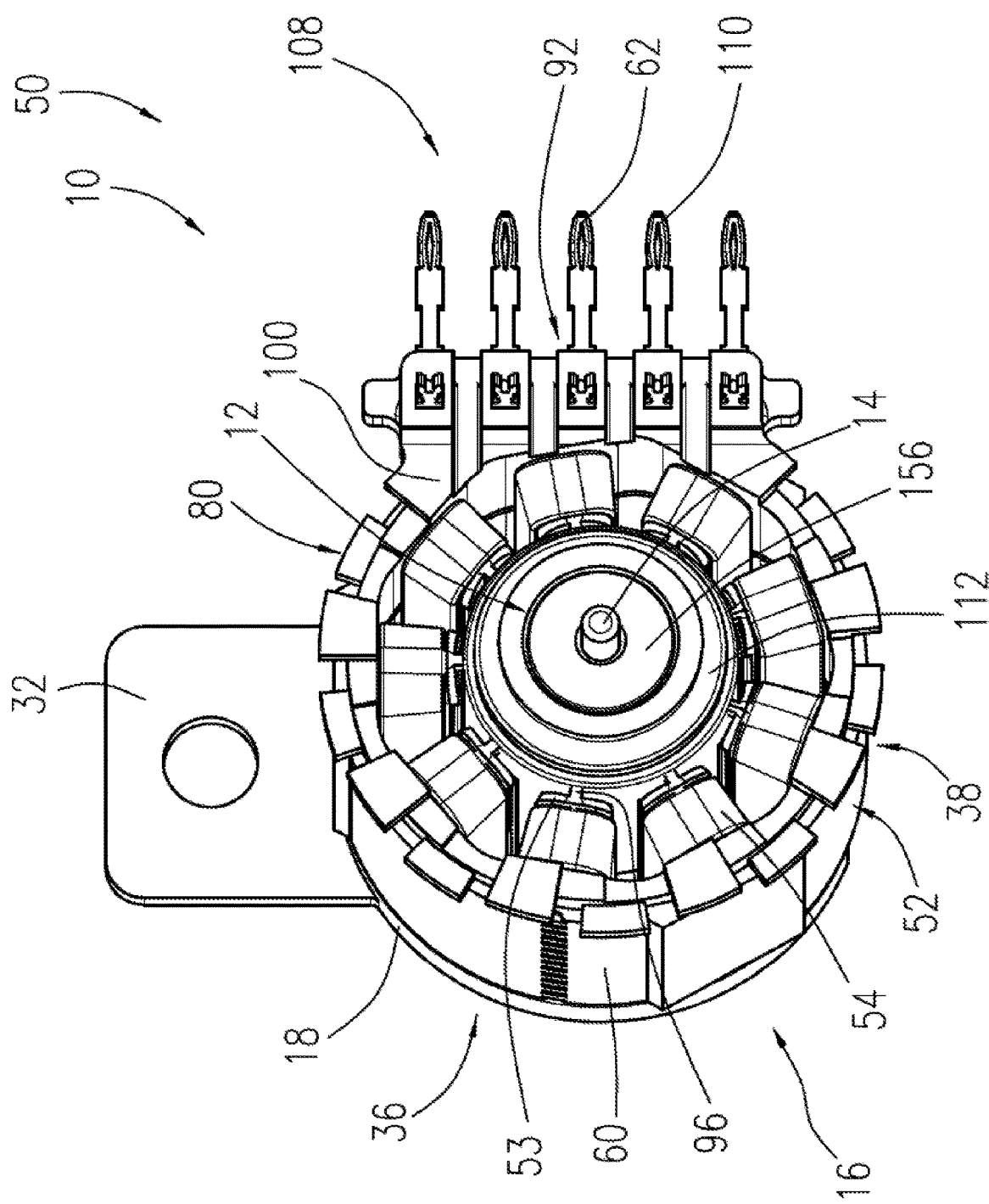
FIG. 1 shows a motor, which includes a motor apparatus comprising a stator and a rotor.

In the following, the present figures are schematic drawings rather than drawings to scale. If not indicated differently, multiple occurrences of objects are only labelled once with reference numerals. Moreover, in order to avoid undue repetition, descriptions of the same or identically configured objects can also be applied to the individual objects.

FIG. 1 shows a motor 50. The present motor is an electronically commutated electric motor (BLDC motor). The motor 50 comprises a motor apparatus 10 which, in the present exemplary embodiment, is formed as an electronically commutated motor apparatus. The motor 50 is provided for use with at least one external structural unit 186, or can drive the external structural unit 186 (cf. FIG. 11). Furthermore, the motor 50 is provided for installation and/or arrangement in a housing unit 180 formed separately from the motor 50 (cf. FIG. 11). The installation or arrangement of the motor 50 will be described in detail below.

The motor apparatus 10 includes a rotor 12 supported to be rotatable about a rotation axle 14. Furthermore, the motor apparatus 10 comprises a stator 16. The stator 16 is provided to receive the rotor in a rotor receiving region of the stator 16 and to at least partially enclose and/or embrace it in the circumferential direction. In accordance with FIGS. 1 and 2, it can be seen that the stator 16 completely embraces and/or encloses the rotor 12 in the circumferential direction. The rotor 12 is provided to be driven for rotation about the rotation axle 14 in the rotor receiving region of the stator 16. The stator 16 is provided to provide an alternating magnetic field to interact with at least one magnetic component of the rotor 12 to thereby in turn drive the rotor 12. By energizing the stator 16 and the associated production of alternating electromagnetic fields, the rotor 12 is able to rotate within the stator 16 in an operating state. In the operating state, the rotor 12 is arranged in a manner in which it is completely spaced from the inside of the stator 16 in the circumferential direction for contactless rotation relative to the stator 16.

Figure 2:
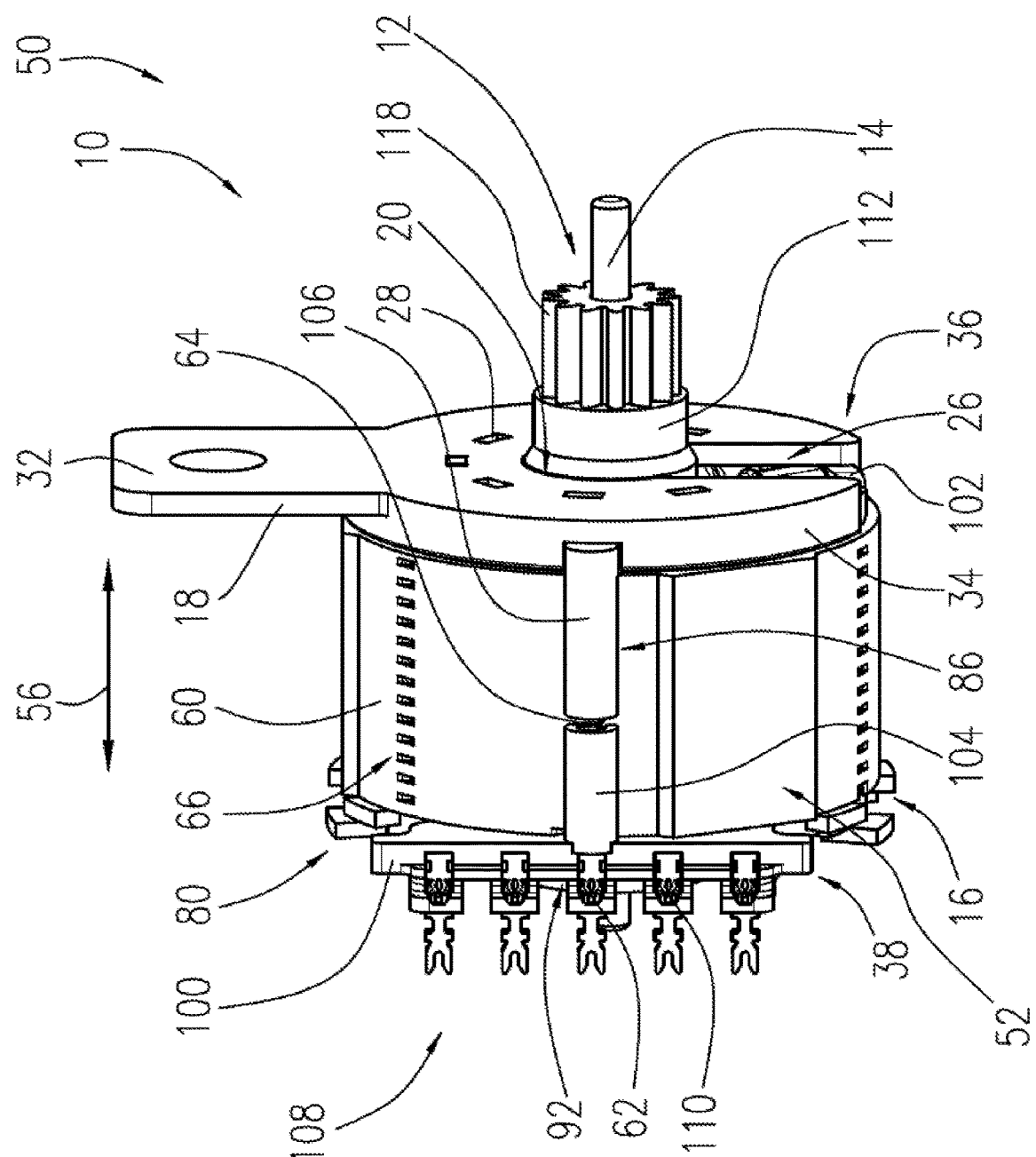
FIG. 2 shows a further view of the motor of FIG. 1.
Figure 3:
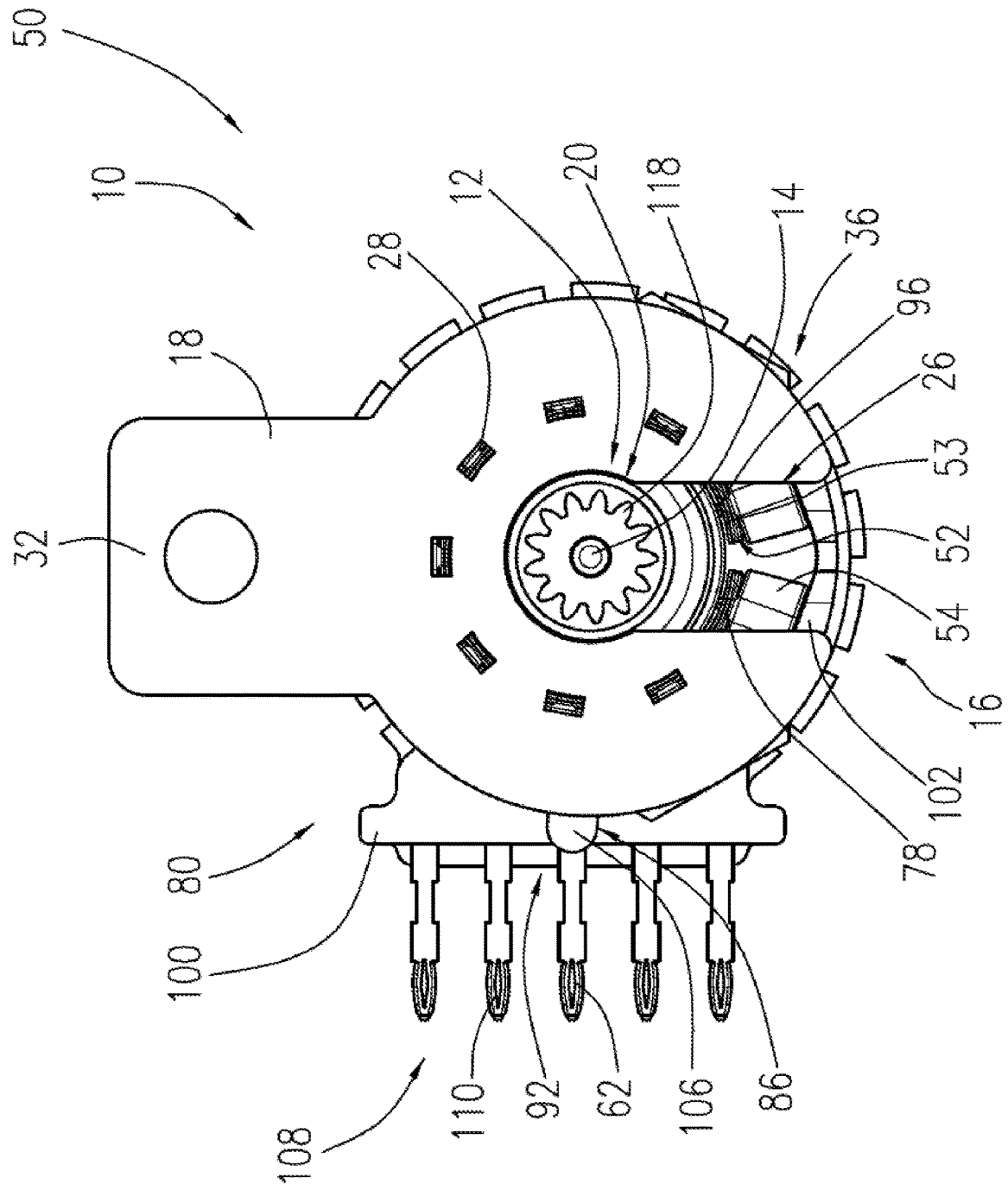
FIG. 3 shows a top view of a transport securing unit of the motor apparatus of FIGS. 1 and 2.

To avoid and/or to prevent at least partial damage and/or destruction of the rotor 12 and/or the stator 16 during transportation and/or installation of the motor 50, for example by uncontrolled and inadvertent movement of the rotor 12 relative to the stator 16, the motor 50 is in a transport securing state at least in accordance with FIGS. 1 to 3. For transport securing, in particular for securing the rotor 12 relative to the stator 16 at least in the transportation state, the motor apparatus 10 includes a transport securing unit 18. The transport securing unit 18 and its functioning as well as further measures for transport securing will be explained in more detail in the description of the figures in accordance with FIGS. 9 to 16 below. Initially, the structure of the motor apparatus 10 will be further explained.

The motor apparatus 10 has a magnetic back iron element 60. The magnetic back iron element 60 is part of the stator 16. The magnetic back iron element 60 consists entirely of at least one metal sheet, in particular an iron metal sheet, furthermore at least one electric sheet. In the present exemplary embodiment, the back iron element 60, consists of a plurality of electric sheets, in particular an electric sheet pack, wherein the individual electric sheets are connected to each other, for example riveted together. An external circumferential surface 66 of the back iron element 60 forms an external surface of the stator 16 at least in part, in the present case completely, in the circumferential direction of the stator 16 (cf. FIGS. 1 to 5).

The stator 16 has a stator core 52. In the present case, the stator core 52 includes the magnetic back iron element 60. Furthermore, the external circumferential surface 66 of the back iron element 60 forms an external surface of the stator core 52. The stator core 52 comprises at least one stator tooth 53. In the present instance, the stator tooth 53 comprises a plurality, in particular at least two, stator teeth 53, which are arranged in the circumferential direction on an inside of the stator 16. The stator teeth 53 extend radially inwardly from the back iron element 60. In the present instance, the stator teeth 53 and the back iron element 60 are integrally formed. The stator core 52 is integrally formed (cf. FIGS. 5 and 5A). In the present exemplary embodiment, the stator core 52 comprises an odd number of stator teeth 53, in particular at least nine stator teeth 53, wherein only one stator tooth 53 is provided with a reference numeral (cf. FIGS. 4 and 5, 5A). The stator tooth 53 is provided to be wound with a coil wire 54 at least in part, and to support and/or to retain the coil wire 54. To simplify illustration, the coil wires 54 for each stator tooth 53 are shown in a block-wise manner (cf. FIG. 4).

Figure 4:
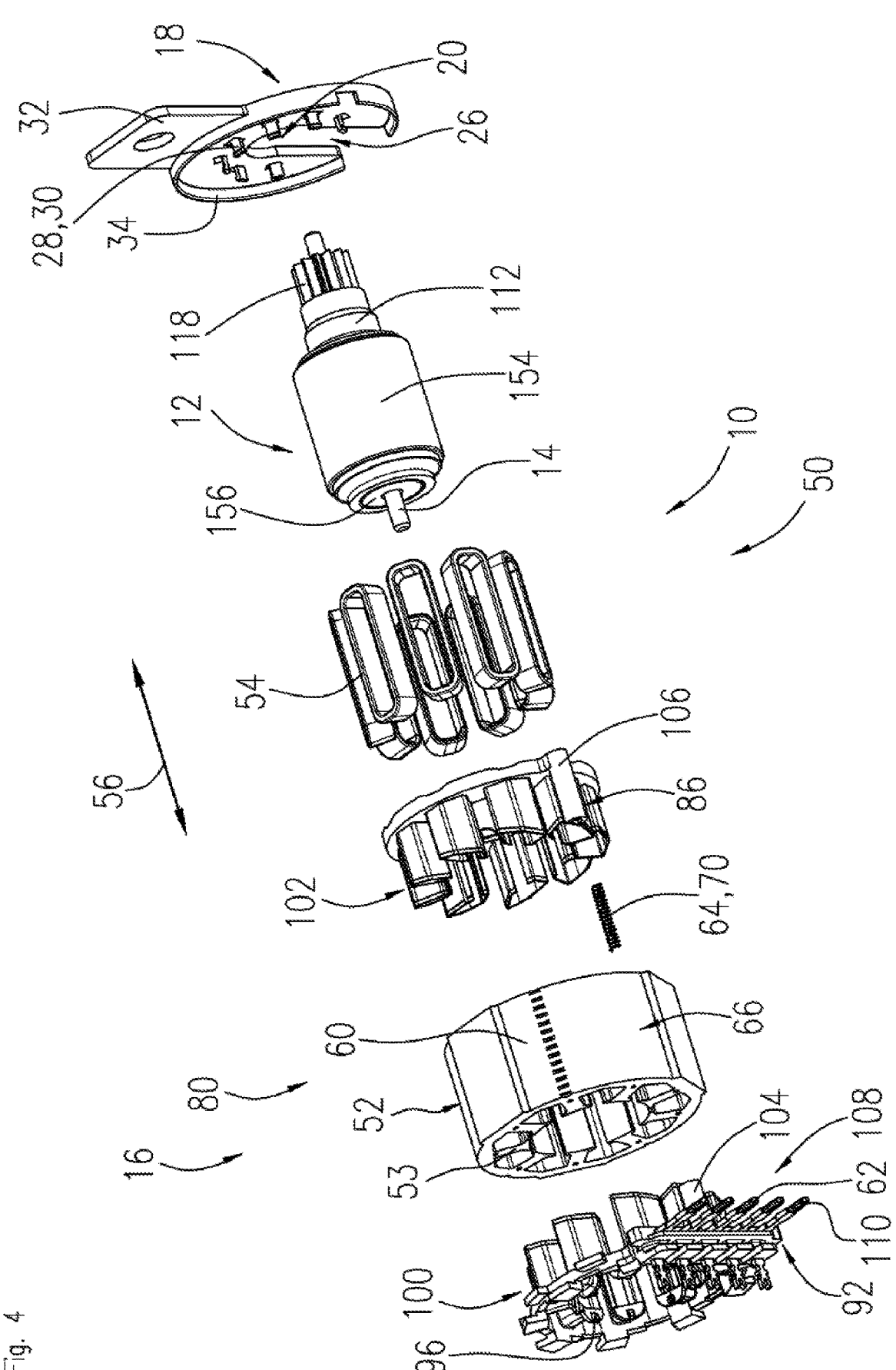
FIG. 4 shows an exploded view of the motor.
Figures 5, 5A:
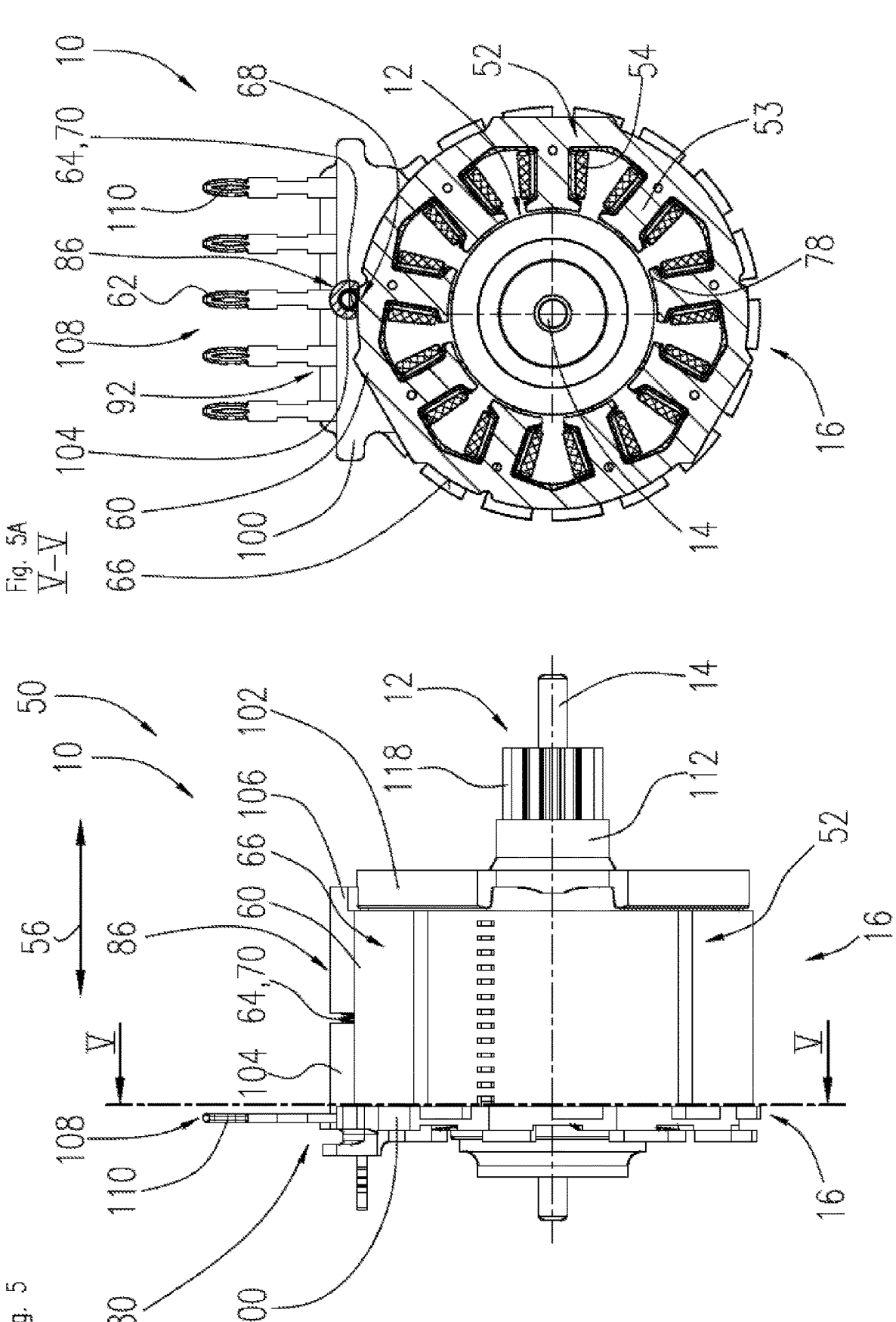
FIG. 5 shows a sectional view of the motor along a plane perpendicular to a rotation axle of the motor apparatus.

FIGS. 4 and 5, or 5A, which shows a sectional view of the motor 50 of FIG. 5, illustrate that the stator core 52 forms the stator tooth 53, in particular the plurality of stator teeth 53, on the inside of the stator 16. For ease of illustration, the transport securing unit 18 has been omitted in FIG. 5. Furthermore, the stator core 52 includes at least one pole shoe 78 on the inside of the stator 16. In the present instance, the stator core 52 includes or forms one pole shoe 78 per stator tooth 53. The pole shoes 78 respectively limit the rotor receiving region at least in part.

For electrical earthing of the back iron element 60, the motor apparatus 10 includes at least one earthing element 62. The earthing element 62, in the present case, is part of a connecting device 108 of the motor apparatus 10. The earthing element 62, in the present exemplary embodiment, is formed as a connector, in particular as an earthing pin (cf., for example, FIGS. 1 to 4). The earthing element 62 is provided to electrically earth the back iron element 60 and to provide an electrically earthing connection of the stator 16 to a printed circuit board of the housing unit 180, in which the motor 50 is installed in the assembled state (cf., for example, FIG. 11 or 14). In the present case, the connecting device 108 includes further connecting elements 110 which, in the assembled state of the motor 50, are electrically connected to the printed circuit board of the housing unit 180. In the present exemplary embodiment, the connecting device 108 includes four further connecting elements 110, wherein only one is provided with a reference numeral. The further connecting elements 110 are also formed as connectors, in particular as connector pins.

Figures 6, 7:
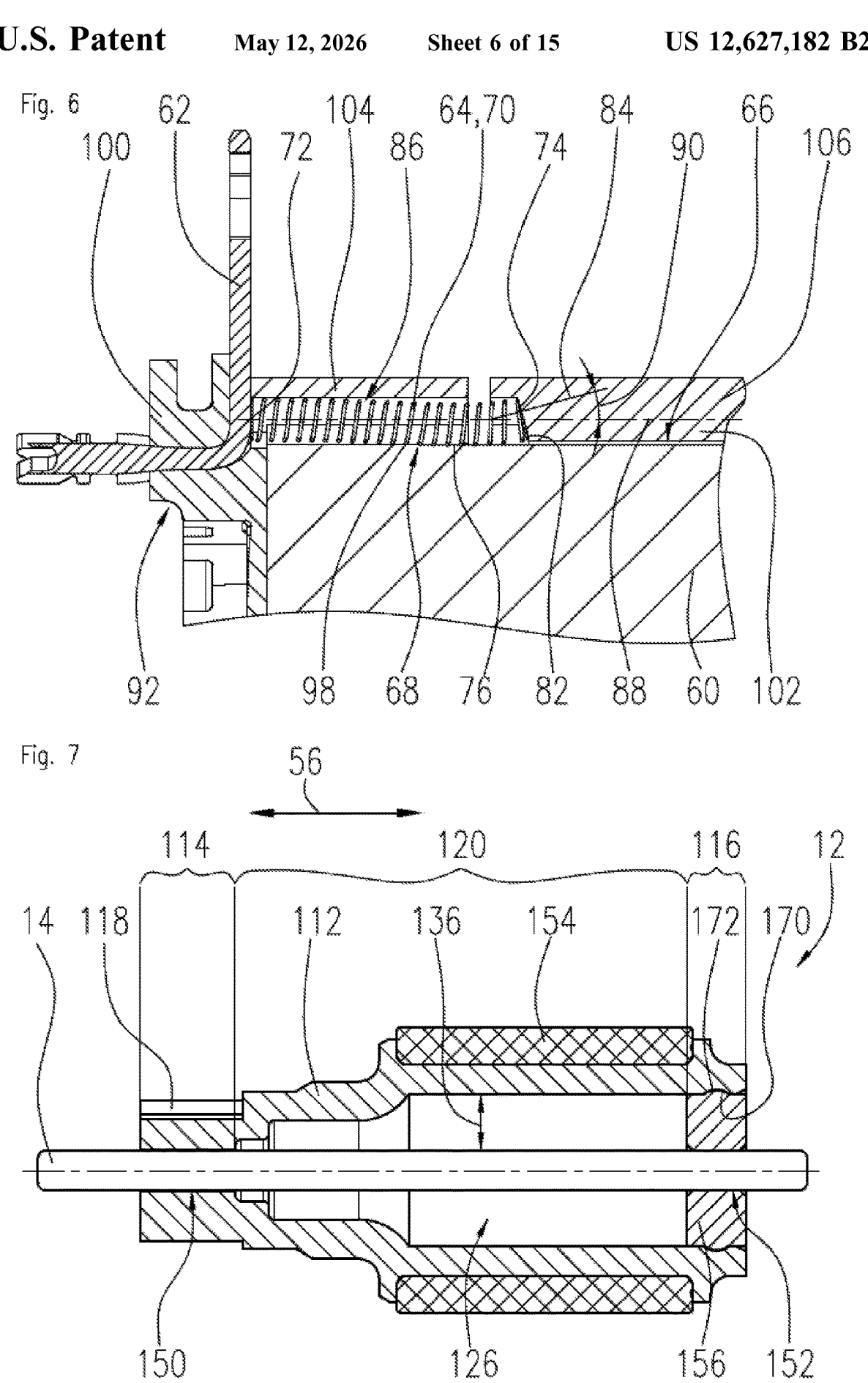
FIG. 6 shows a detail view of a back iron element of the stator and a contact element of the motor apparatus for contacting the back iron element with an earthing element of the motor apparatus.
FIG. 7 shows a sectional individual view of the rotor supported on a rotation axle of the motor apparatus and comprising a base body and at least one magnet.

To provide contacting of the back iron element 60 with the earthing element 62, the motor apparatus 10 includes an elastic contact element 64 which connects the earthing element 62 to the back iron element 60 in an electrically conductive manner (cf. FIGS. 4 to 6). In the present exemplary embodiment, the contact element 64 is formed as coil spring 70. In accordance with FIG. 6, contacting of the back iron element 60 with the earthing element 62 by means of contact element 64 is shown in detail. FIG. 6 illustrates that the contact element 64 makes contact with an exterior circumferential surface 66 of the back iron element 60.

Depending on the arrangement and/or positioning of the contact element 64, in particular depending on the deflection and/or bias and/or bending and/or compression of the coil spring 70 relative to the external circumferential surface 66 of the back iron element 60, the contact element 64 has at least one contact point 98 with the exterior circumferential surface 66 of the back iron element 60. To enable particularly solid and efficient contacting between the contact element 64 and back iron element 60, the contact element 64 can have more than one contact point 98, for example at least five contact points 98, with the exterior circumferential surface 66 of the back iron element 60. The contact element 64 is deformable, in particular flexibly bendable. Furthermore, the contact element 64 is reversibly elastically deformable.

By means of the contact element 64, the earthing element 62 is arranged to be directly contact-free with respect to the back iron element 60, or is free of direct contact to the back iron element 60. The contact element 64 is provided to provide and/or to enable an indirect connection and/or contact between the earthing element 62 and the back iron element 60 (cf. FIG. 6).

Furthermore, a circumferential surface 76 of the coil spring 70 contacts the back iron element 60. Alternatively, it is also conceivable that an end face of the coil spring 70 contacts the back iron element 60, in particular contacts the exterior circumferential surface 66 of the back iron element 60. In the present case, an end face 72 of the coil spring 70 contacts the earthing element 62. For differentiation purposes, the end face 72 will be called a first end face 72. The first end face 72 forms a first end of the coil spring 70. To provide and/or to ensure uniform contacting of the coil spring 70 with the earthing element 62 and/or to optimize stiffness and/or strength of the coil spring 70, the first end of the coil spring 70 is closed, in particular double wound in the present case. In the present exemplary embodiment, the back iron element 60 includes a coating at least in part, wherein the contact element 64 of the back iron element 60 makes contact in an uncoated portion 68 (cf. FIG. 6).

For retaining at least the contact element 64 relative to the back iron element 60, the motor apparatus 10 includes a slot insulation unit 80 (cf. FIGS. 2 and 4 to 6). In the present case, the slot insulation unit 80 is part of the stator 16, in particular a subassembly thereof. The slot insulation unit 80 is at least partially, advantageously at least largely or completely, formed of a mineral, for example ceramic, a plastic material, for example a polymer, in particular polyamide, preferably glass-fiber-reinforced polyamide, and/or a metal and/or a composite material. In the present case, the slot insulation unit 80 is formed to be in one piece, in particular is integrally formed at least in part. Furthermore, the slot insulation unit 80 forms an insulation unit for electric insulation. In accordance at least with FIGS. 2, 4 and 5, the slot insulation unit 80 embraces the stator core 52 at least in part.

The slot insulation unit 80 in the present case includes a first slot insulation element 100 and a second slot insulation element 102 (cf., for example, FIG. 4), which are arranged on different sides with respect to an axial direction 56, in particular as viewed along the rotation axle 14, on the back iron element 60. In the present case, the first slot insulation element 100 and the second slot insulation element 102 are arranged on opposite sides of the stator core 52, and likewise of the back iron element 60. The first slot insulation element 100 and the second slot insulation element 102 are provided to at least partially embrace and/or enclose the stator teeth 53. The first slot insulation element 100 and the second slot insulation element 102 at least partially embrace together at least one stator tooth 53 of the stator teeth 53, in the present case all of the stator teeth 53. As viewed in the axial direction 56, the first slot insulation element 100 and the second slot insulation element 102 are respectively arranged on different sides of the stator core 52, in particular on all stator teeth 53. In the present exemplary embodiment, the first slot insulation element 100 and the second slot insulation element 102 embrace the stator tooth 53 in a proportion of at least essentially 50%/50% in relation to a longitudinal extension of the stator tooth 53 on respective different sides, in particular from opposite sides. The longitudinal extension of the stator tooth 53 extends in the axial direction 56, in particular at least essentially parallel to the rotation axle 14. As an alternative, it is also conceivable that only the first slot insulation element 100 or the second slot insulation element 102 embraces the stator tooth 53. In the present case, the coil wire 54 contacts the first slot insulation element 100 and the second slot insulation element 102 per stator tooth 53. Herein, the coil wire 54 is arranged to be at least partially contact-free with respect to the stator core 52.

The slot insulation unit 80 includes a receiving channel 86, in which the contact element 64 is at least partially arranged (cf. FIGS. 2, 5, 5A and 6). In the present case, the receiving channel 86 extends over at least 30% of an overall extension of the exterior circumferential surface 66 of the back iron element 60 in the axial direction 56, in particular a longitudinal extension of the exterior circumferential surface 66 of the back iron element 60 parallel to the rotation axle 14 (cf. FIGS. 2 and 5). In accordance with FIGS. 2 and 4 to 6, it can be seen, that in the present exemplary embodiment, the slot insulation element 100 forms a first portion 104 of the receiving channel 86 and the second slot insulation element 102 forms a second portion 106 of the receiving channel 86. The first slot insulation element 100 and the second slot insulation element 102 could also form the receiving channel 86 in portions of the same size. In the present case, the first slot insulation element 100 forms a larger portion of the receiving channel 86 with the first portion 104 than the second slot insulation element 102 forms with the second portion 106 (cf. FIG. 6). In the present case, the first portion 104 forms at least 60% of the receiving channel 86.

FIG. 6 illustrates that an end face 74 of the coil spring 70 is supported on a supporting surface 82 of the slot insulation unit 80. For differentiation purposes, the end face 74 will be designated as the second end face 74 in the following. The second end face 74 forms a second end of the coil spring 70. To provide and/or to ensure uniform contacting of the coil spring 70 with the supporting surface 82 of the slot insulation unit 80 and/or to optimize stiffness and/or strength of the coil spring 70, the second end of the coil spring 70 is closed, in particular double wound in the present case. It is made clear in accordance with FIG. 6, that the supporting surface 82 is formed to be oblique. A normal direction 84 of the supporting surface 82, in the present case, forms an angle 90 of more than 0° with a main extension direction 88 of the receiving channel 86 (cf. FIG. 6). In the present exemplary embodiment, the angle 90 between the normal direction 84 of the supporting surface 82 and the main extension direction 88 of the receiving channel 86 is at least 15°. Depending on the obliqueness of the supporting surface 82, the coil spring 70 can be deflected, stressed and/or bent with respect to the external circumferential surface 66 of the back iron element 60 in different degrees. In turn, this can influence the number of contact points 98 of the coil spring 70 with the exterior circumferential surface 66 of the back iron element 60.

In accordance with the explosive view of FIG. 4, and the arrangement of the slot insulation unit 80 relative to the contact element 64 and the back iron element 60 according to FIG. 6, it is to be seen that during the manufacture and/or assembly of the stator 16, in a first step, the first slot insulation element 100 is arranged on the stator core 52, for example is slid onto the stator core 52, and subsequently, in a second step, the contact element 64 is placed in the first portion 104 of the receiving channel 86. Furthermore, in a third step, subsequently the second slot insulation element 102 is arranged on the stator core 52, for example is slid onto the stator core 52. Thereby the coil spring 70 is compressed and the circumferential surface 76 of the coil spring 70 is pressed against the exterior circumferential surface 66 of the back iron element 60 to form at least the contact point 98. In a subsequent fourth step, the stator teeth 53 are wound with the coil wire 54.

Furthermore, the slot insulation unit 80 includes a retainer 92 for the earthing element 62 (cf., for example, FIGS. 1 and 3 to 5, or 5A). At least one of the slot insulation elements, in particular the first slot insulation element 100 and/or the second slot insulation element 102, can receive and/or retain the connecting device 108 at least in part. In the present case, the first slot insulation element 100 includes the retainer 92 for the earthing element 62 (cf. FIGS. 1 and 6). In the present exemplary embodiment, the earthing element 62 and the first slot insulation element 100 are at least partially integrally connected to each other. In the present case, the earthing element 62 is at least partially insert molded into the first slot insulation element 100. Furthermore, the above-mentioned further connecting elements 110 of the connecting device 108 are additionally received and/or retained in the first slot insulation element 100. At least in accordance with FIGS. 1 to 5, the further connecting elements 110 and the earthing element 62 are juxtaposed. In the present exemplary embodiment, the further connecting elements 110 are also at least partially insert molded in the first slot insulation element 100. The coil wire 54, in particular after being wound on at least one stator tooth 53, in the present case after being wound on at least three stator teeth 53, can be routed from the stator tooth 53 to the connecting device 108, in particular preferably without contacting the back iron element 60. The coil wire 54 is connectable to at least one of the further connecting elements 110 formed as contact pins.

Furthermore, in the following, the structure of the rotor 12 will be described in more detail with reference to FIGS. 7 and 8. FIG. 7 illustrates that the rotor 12 is supported on the rotation axle 14 in a manner rotatable relative thereto in a first region 114 and at least one second region 116. The first region 114 and the second region 116 thus form a first bearing region and a second bearing region of the rotor 12. In the present case, the first region 114 and the second region 116 respectively extend completely within the internal circumferential direction of the rotor 12 about the rotation axle 14. The first region 114 and the second region 116 respectively form circular disc-shaped regions about the rotation axle 14. FIG. 7 shows that the first region 114 is situated at a first end of the rotor 12. The second region 116 is situated at a second end of the rotor 12.

Alternatively, the rotor 12 could also include further bearing regions for providing support on the rotation axle 14. In the present case, the first end of the rotor 12 and the second end of the rotor 12 are opposite ends of the rotor 12 as viewed along the rotation axle 14.

FIG. 7 illustrates that the rotor 12 includes a hollow space 126 about the rotation axle 14 in an intermediate region 120 between the first region 114 and the second region 116. The hollow space 126 extends radially about the rotation axle 14. In the intermediate region 120, the rotation axle 14 is arranged without contact to the rotor 12.

The rotor 12 includes a base body 112. The base body 112 is at least largely formed of a plastic material. The plastic material is a sliding-optimized plastic material having high strength, wear resistance and/or heat resistance, as exhibited, for example by PPA or PTFE. The base body 112 is in one piece, in particular is integrally formed. In the present case, the base body 112 is formed as an injection molded part. Furthermore, at least one magnet 154 of the rotor is multi-component injection molded on the base body 112. The magnet 154 is a permanent magnet. The rotor 12 can also include further magnets 154, for example, two or four magnets, which are arranged on an outside of the rotor in the circumferential direction. The base body 112 is at least partially in one piece or is integrally formed.

A gear element 118 is arranged in the first region 114 of the rotor 12. The gear element 118 is provided for the transmission of a torque. In the present case, in the assembled state, the gear element 118 is provided to transmit a torque to the external structural unit 186 (cf. FIG. 11). In the present exemplary embodiment, the gear element 118 is formed as a driving gear and the external structural unit 186 is formed as a driven gear. The base body 112 is supported on the rotation axle 14 in a manner rotatable relative thereto in the first region 114 and is integrally formed with the gear element 118 (cf. FIGS. 7 and 8). The base body 112 extends entirely in the first region 114 and at least along the intermediate region 120. In the present case, the first region 114, in particular the first bearing region, is entirely formed by the base body 112.

The rotor 12 could also have an at least essentially constant radial distance 136 of the base body 112 from the rotation axle 14 in the intermediate region 120. In the present case, the base body 112 has a plurality of regions, however, in which the radial distance 136 of the base body 112 from the rotation axle 14 varies. In accordance with FIG. 7, it is illustrated that there is a stepwise increase of the radial distance 136. Starting from the first region 114, the radial distance 136 is increased in a stepwise manner towards the second region 116.

Figure 8:
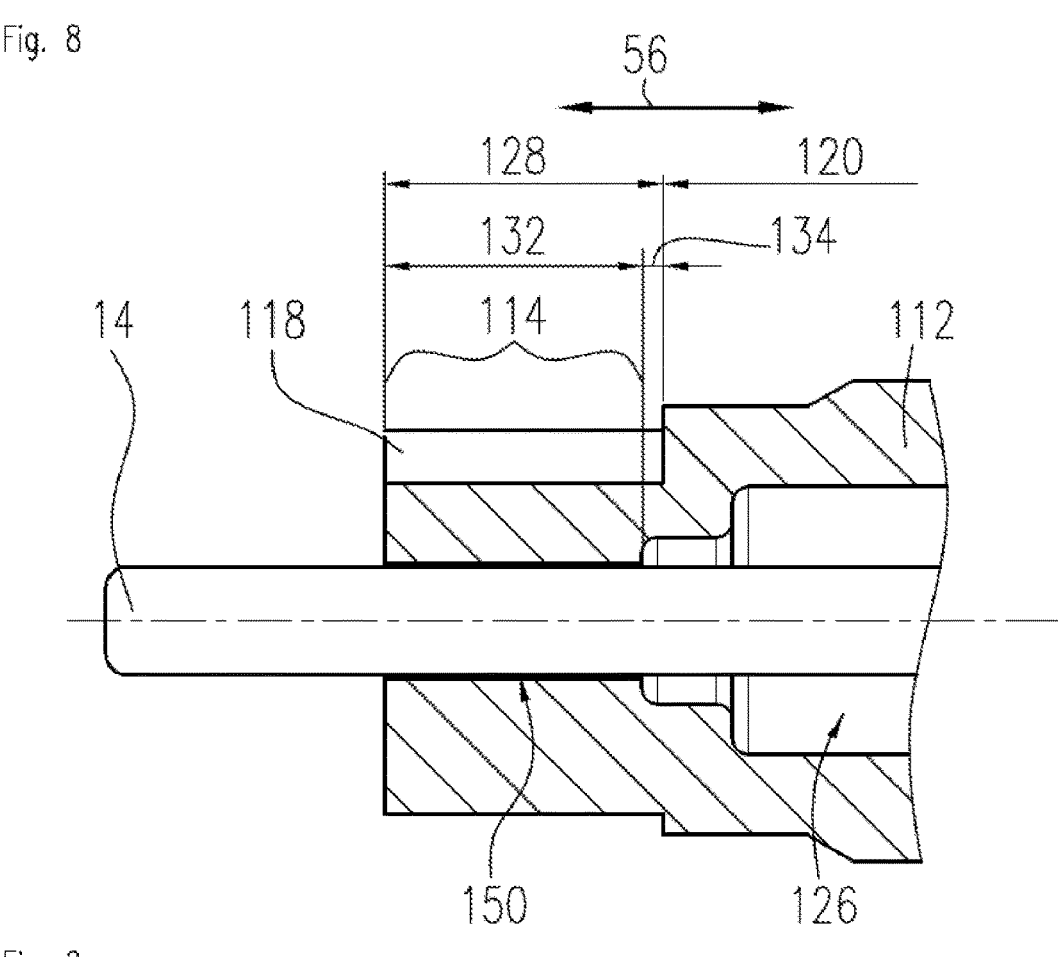
FIG. 8 shows a close-up view of a gear element of the rotor in a first region of the rotor formed as a bearing region for supporting the rotors on the rotation axle.

FIG. 8 shows a close-up view of at least the first region 114. It can be seen, that an extension 128 of the gear element 118 along the rotation axle 14 is larger than an extension 132 of the first region 114 along the rotation axle 14. In the present exemplary embodiment, the extension 128 of the gear element 118 along the rotation axle 14 is at least 5 mm. The extension 132 of the first region 114 along the rotation axle 14 is at least 4.8 mm.

To ensure a uniform diameter of a rotation axle support for supporting the rotation axle 14 in the first region 114 during manufacture of the rotor 12, and in particular of the base body 112, the rotor 12 has a greater material thickness in the first region 114 than in a third region 134 directly adjacent to the first region 114. In the present case, the rotor 12 has a material thickness of at least 2.5 mm in the first region 114. The material thickness in the third region 134 is at least 2 mm. The third region 134 precisely corresponds to that portion of the rotor 12, in particular of the base body 112, which represents the difference between the extension of the first region 114 and the extension of the gear element 118. Thus, the third region 134 is part of the intermediate region 120. The third region 134 is immediately adjacent to the first region 114, in particular without any interposed regions and/or portions of the rotor 12 (cf. FIG. 8).

In the present exemplary embodiment, a first sliding contact point 150 of the rotor 12 with the rotation axle 14 in the first region 114 and a second sliding contact point 152 of the rotor 12 with the rotation axle 14 in the second region 116 are each formed of a plastic material. The rotor 12 is slidably supported on the rotation axle 14 at the first sliding contact point 150 and at the second sliding contact point 152 (cf. FIG. 7). It is conceivable that the rotor 12, and in particular the base body 112, at at least one of the sliding contact points 150, 152, is supported in direct contact on the rotation axle 14 and directly contacts the rotation axle 14 at least in parts. In the present case, a lubricant, such as a grease, is arranged and/or inserted between the rotor 12 and the rotation axle 14 at the first sliding contact point 150 and at the at least second sliding contact point 152.

The base body 112 forms the first sliding contact point 150 in the first region 114. In the present case, the rotor 12 includes a bearing element 156 formed separately from the base body 112, which includes the second sliding contact point 152. The bearing element 156 is a bearing disc. The bearing element 156 is radially disposed about the rotation axle 14. The bearing element 156 is at least largely formed of a plastic material. In the present case, the bearing element 156 and the base body 112 are made of the same plastic material. Furthermore, the plastic material is the above-mentioned sliding-optimized plastic material.

In accordance with FIG. 7, it can be seen that the base body 112 and the bearing element 156 are connected to each other at least in a form-fitting manner. The bearing element 156 includes a boss 170 at least in parts and, in the present case, over the entire circumference, for connection to the base body 112. To connect to the bearing element 156, the base body 112 has at least one recess 172 corresponding to the boss 170 in the second region 116 at least in portions and, in the present case, over the entire circumference. In the assembled state of the bearing element 156, the boss 170 engages the recess 172. In accordance with the present embodiment, the bearing element 156 can be clipped into the base body 112. Furthermore, the bearing element 156, in the assembled state, is fixed on the base body 112 in a manner resistant to pressure. In the assembled state, the bearing element 156 is in full surface contact with the base body 112 over the entire circumference. In addition to fixing the bearing element 156 on the base body 112 by means of a form-fitting connection, frictional and/or adhesive connections could also be provided to optimize fixing and/or securing of the bearing element 156 to the base body 112 and to increase the service life of the fixing and/or securing.

The transport securing device of the motor 50 will be further discussed in the following in more detail, which is provided after manufacture of the motor 50 for securing the rotor 12 relative to the stator 16 during transportation up to the time of assembly of the motor 50 in the housing unit 180 and initial operation of the motor 50. As described above, the motor apparatus 10 includes the transport securing unit 18 for securing the rotor 12 relative to the stator 16 at least in the transportation state. In the present case, the transport securing unit 18 is provided for radial and/or axial securing of the rotor 12 relative to the stator 16. In the transportation state, the rotor 12 is supported and/or fixed relative to the stator 16 in a rotation- and/or movement-resistant manner. In the transportation state, the transport securing unit 18 prevents sliding and/or displacement of the rotor 12 in the axial direction 56, in particular along the rotation axle 14, relative to the stator 16. Furthermore, in the transportation state, a contact-free arrangement at least of the magnet 154 of the rotor 12 is ensured and/or provided with respect to the pole shoes 78. This prevents the rotor 12, in particular the magnet 154, from impacting on at least one of the pole shoes 78. As can be seen in accordance with FIGS. 1 to 3, the transport securing unit 18 is at least partially arranged in surface contact against the stator 16 and the rotor 12.

Figure 9:
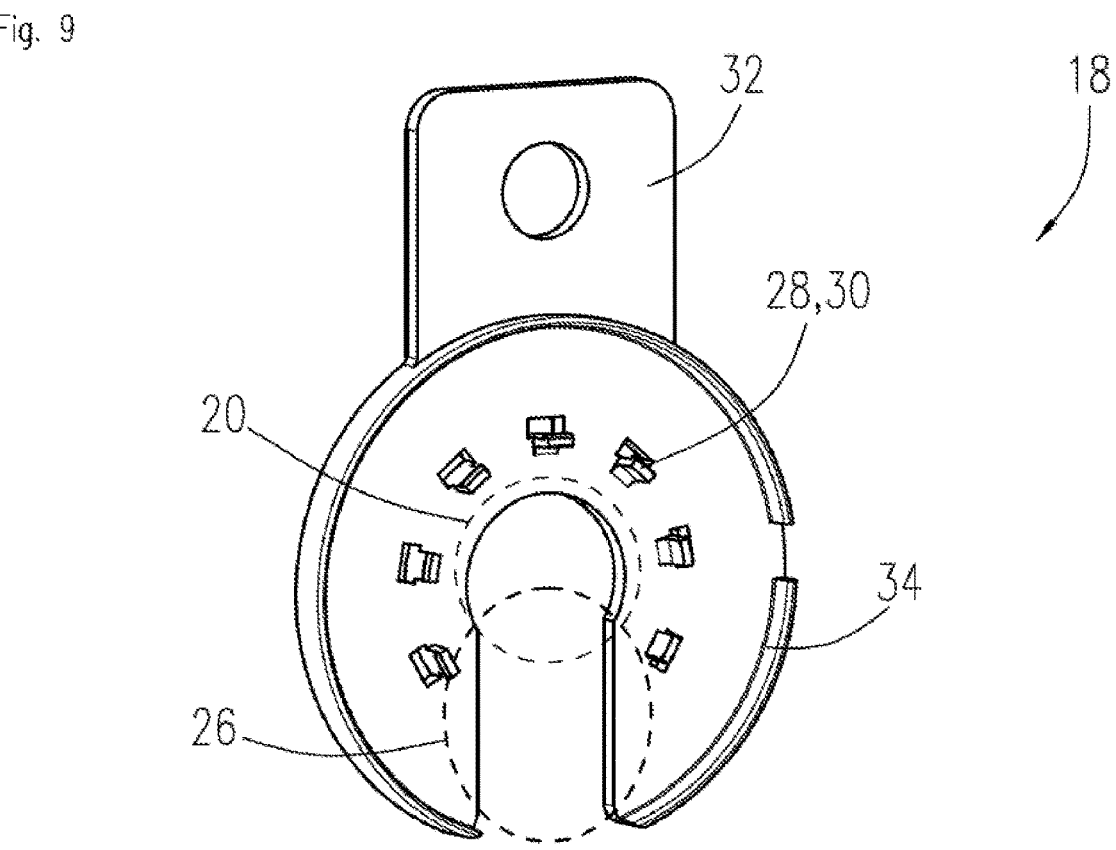
FIG. 9 shows an individual view of the transport securing unit.

The transport securing unit 18 is shown in an individual view in FIG. 9. To at least partially receive the rotor 12 in the transportation state, the transport securing unit 18 includes at least one receiving region 20. The receiving region 20 embraces the rotor 12 in the transportation state at least partially in the circumferential direction (cf. FIG. 3). In the present case, the receiving region 20 embraces the base body 112 of the rotor 12 at least partially in the circumferential direction (cf. FIG. 2). FIG. 2 shows that, in the transportation state, the transport securing unit 18 is arranged on an end 36 of the stator 16 relative to the rotation axle 14. In the present case, the end 36 is an end of the stator 16 opposite to another end 38 of the stator 16. In the present exemplary embodiment, the earthing element 62 and also the connecting device 108 are arranged at the other end 38 (cf. FIG. 2).

To fix the transport securing unit 18 on the stator 16, the transport securing unit 18 includes at least one securing element 28 at least in portions in the circumferential direction, which is fixed on the stator 16 in a locking position. In accordance with FIGS. 3 and 9, the transport securing unit 18 includes a plurality of securing elements 28, wherein only one securing element 28 is provided with a reference numeral. In the present exemplary embodiment, the securing element 28 is formed as a detent hook 30. In the transportation state, the securing element 28 engages an opening 160 of the stator 16. In the present case, the second slot insulation element 102 includes the opening 160 (cf. FIGS. 10, 12a, 12b and 15). In the present exemplary embodiment, the stator 16 and the transport securing unit 18 form a bayonet connection, or are connected and/or fixed to each other by means of a bayonet connection in the transportation state. Furthermore, the transport securing unit 18 includes a rim 34 protruding in the circumferential direction at least in portions. When the transport securing unit 18 is arranged on the stator 16, the protruding rim 34 embraces the stator 16 at least in part (cf. FIGS. 2, 9 and 10).

Figure 11:
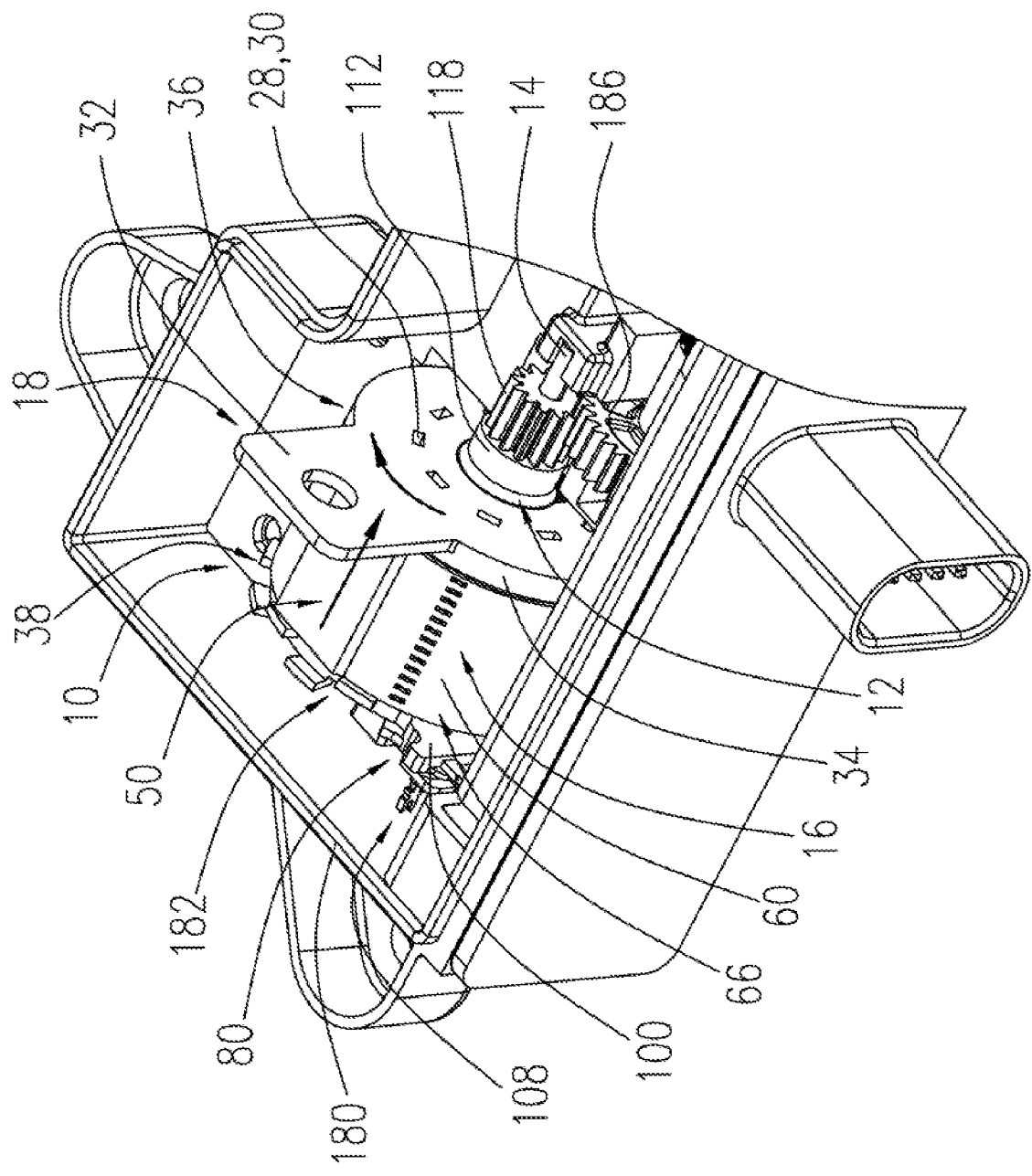
FIG. 11 shows an installed state of the motor in a housing unit formed separately from the motor, wherein the motor is in a transportation state.

A method for installing and/or arranging the motor apparatus 10 in the housing unit 180, for removing the transport securing device 18 and for enabling a rotation of the rotor 12 includes a plurality of method steps and partially a plurality of partial method steps. The method mentioned above is provided for the stator 16 and the rotor 12 to make a transition and/or change from the transportation state to the operating state. In a first method step, the motor apparatus 10 is arranged and/or positioned in the housing unit 180, in particular in the bearing region 182. Once the motor 50, or the motor apparatus 10, has been installed in the housing unit 180, at least the transport securing unit 18 has to be removed to enable initial operation of the motor 50. FIG. 11 shows the installed state of the motor 50 in the bearing region 182 of the housing unit 180.

Figure 10:
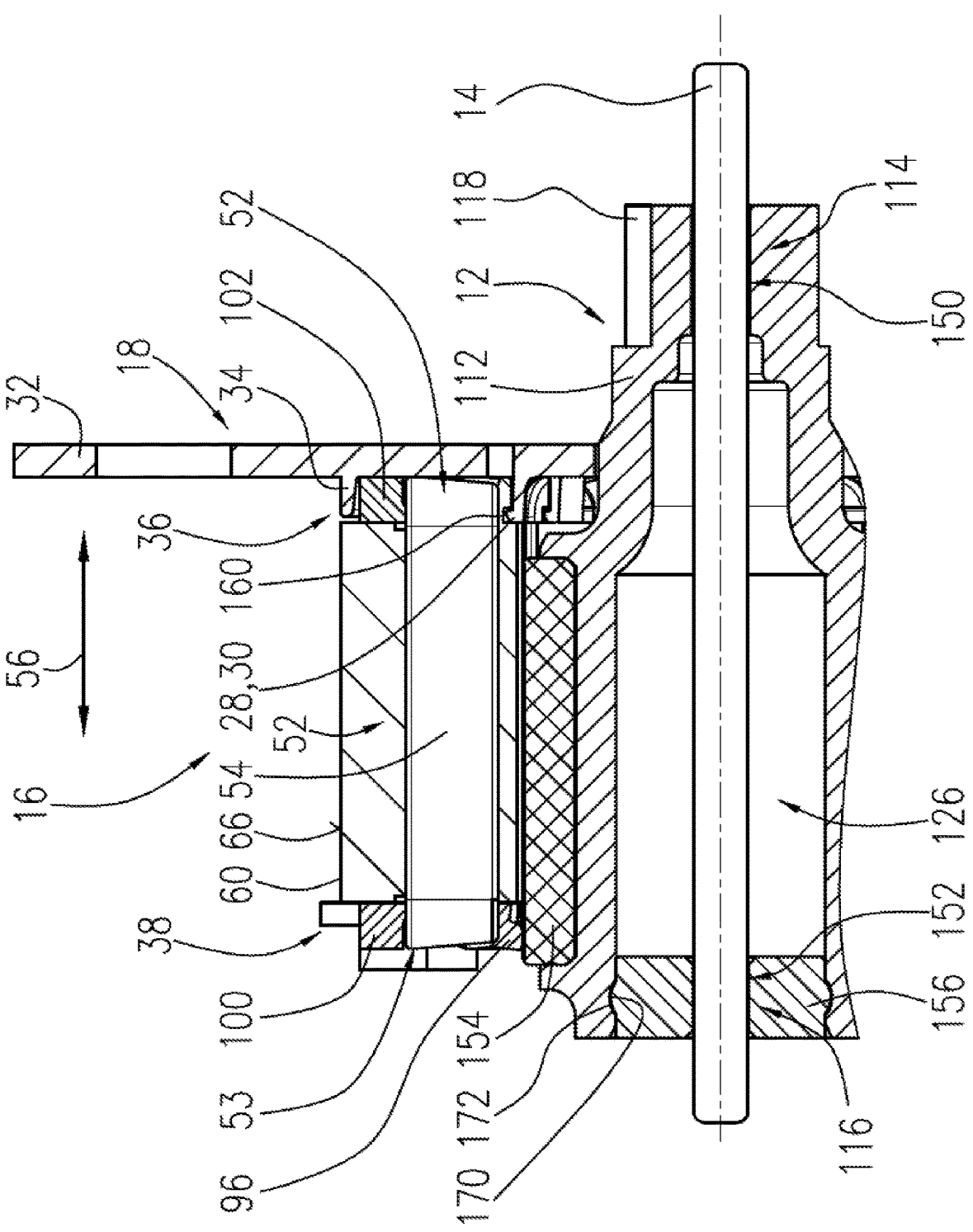
FIG. 10 shows a sectional view of the motor of FIG. 2 comprising a transport securing unit, wherein the motor is still in a transportation state.
Figure 12B:
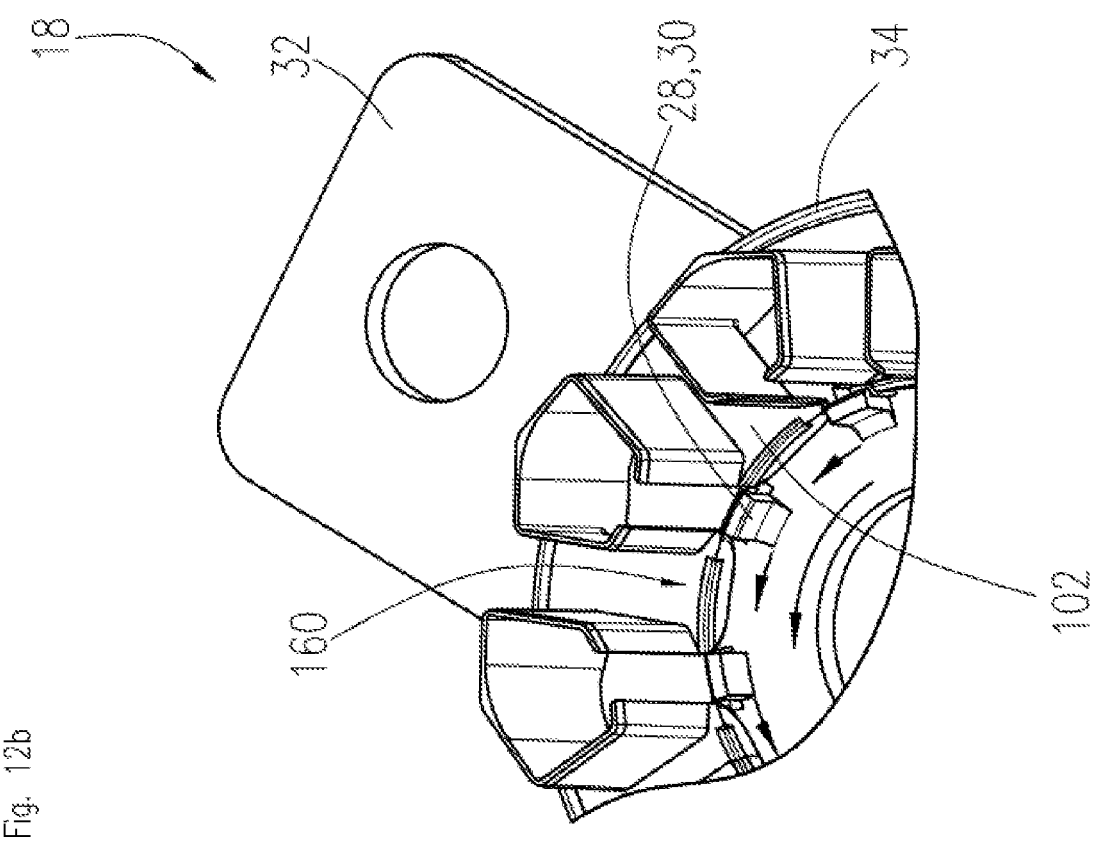
FIG. 12 shows the transport securing unit transitioning from a locking position to an unlocking position relative to a second slot insulation element of a slot insulation unit of the stator, on which the transport securing unit is fixed in the locking position.
Figure 12A:
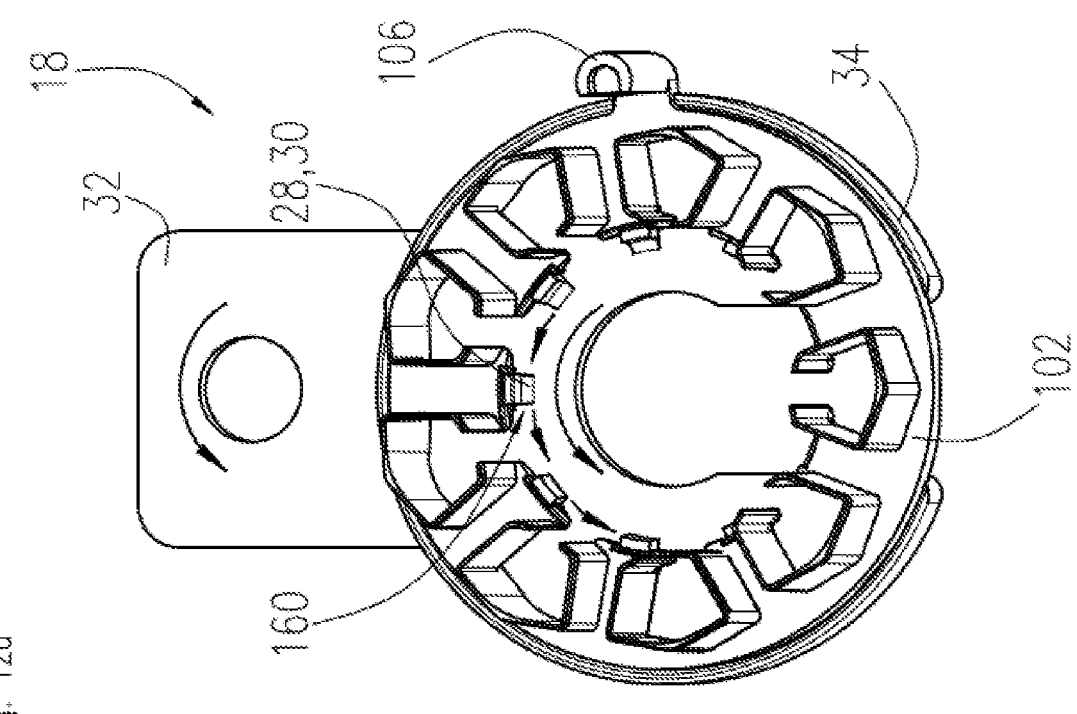

In a second method step, the transport securing unit 18 is removed from the stator 16 and the rotor 12. Furthermore, the second method step, in a timeline of the method, is performed after the first method step. In the present exemplary embodiment, the transport securing unit 18 can be transitioned from a locking position to an unlocking position by rotation about the rotation axle 14 relative to the stator 16. FIGS. 10 and 11 illustrate the arrangement of the transport securing unit 18 in the locking position. In the present case, in the second method step, in particular, in a first second partial method step, the transport securing unit 18 transitions from the locking position to the unlocking position by rotation about the rotation axle 14 relative to the stator 16. The indicated arrows serve to illustrate that the transport securing unit 18 can transition from the locking position to the unlocking position by a right-hand rotation about the rotation axle 14 relative to the stator 16. FIGS. 12a and 12b show a detail view of the transport securing unit 18 and a portion of the second slot insulation element 102. According to FIG. 12a, at least the securing element 28, 30 formed as a detent hook is snapped in and/or arranged in the opening 160 of the second slot insulation element 102. By rotating the transport securing unit 18, the securing element 28 can be released from the opening 160. While FIG. 12a shows the locking position of the transport securing unit 18, FIG. 12b shows the unlocking position of the transport securing unit 18.

To improve operation, in particular handling of the transport securing unit 18, the transport securing unit 18 includes at least one actuating element 32 to enable manual operation and removal of the transport securing element 18 from stator 16 and/or rotor 12 (cf., for example, FIGS. 9, 12a, 12b and 14). In the present case, the transport securing unit 18 can transition from the locking position to the unlocking position by rotation on the actuating element 32.

Figures 13A, 13B:
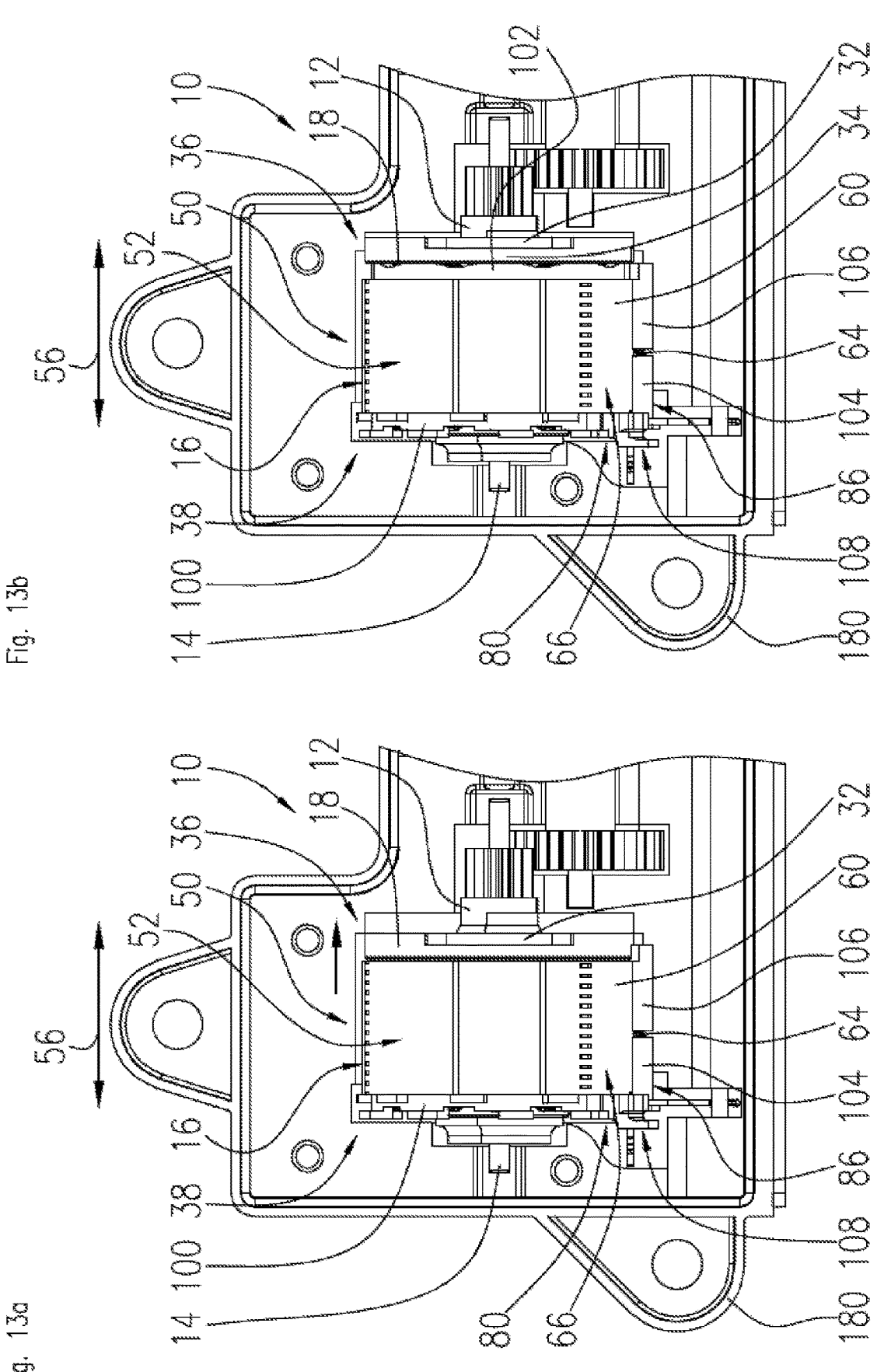
FIG. 13 shows a displacement of the transport securing unit starting from the unlocking position along the rotation axle for removing from at least the stator.
Figure 14:
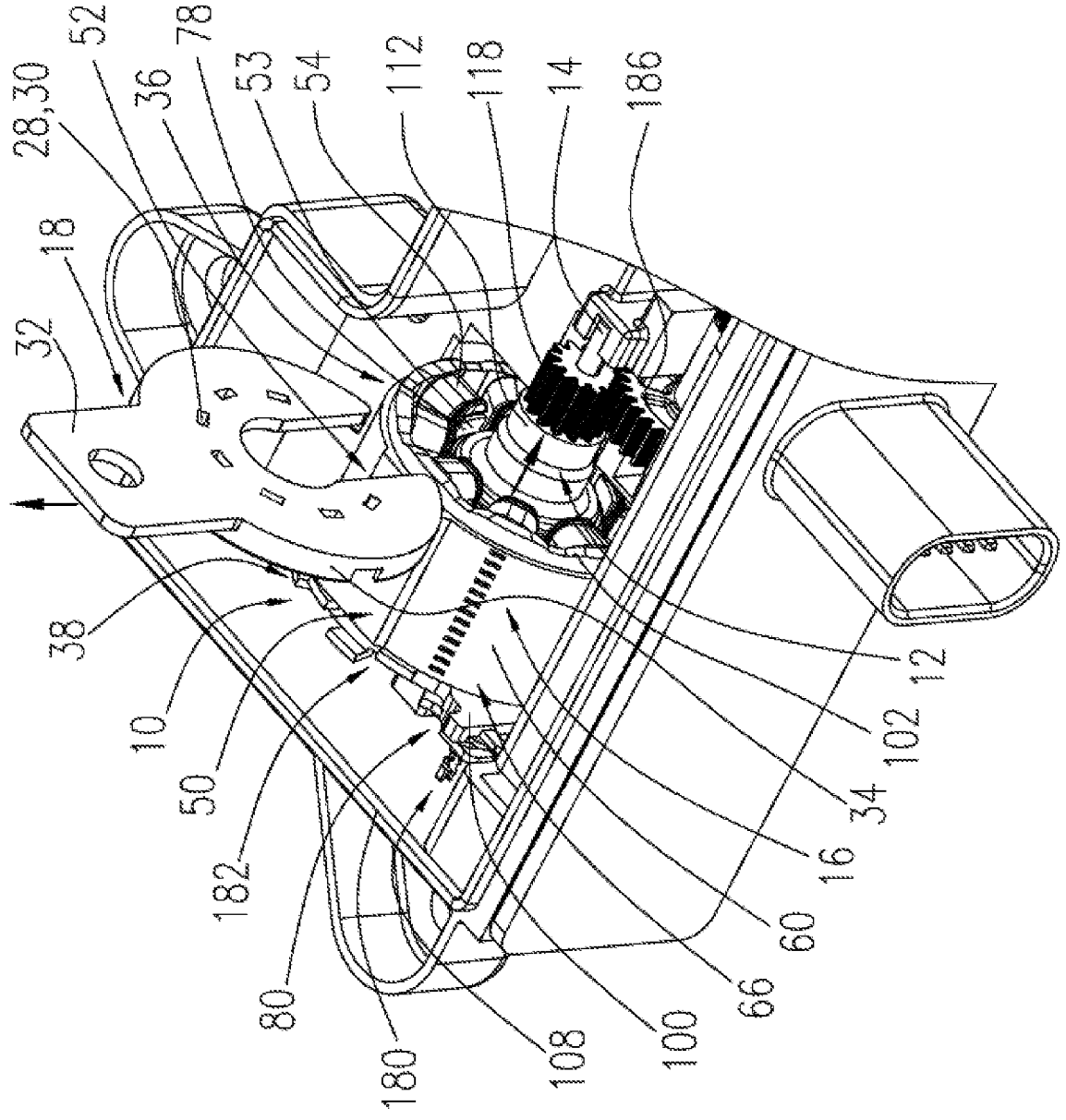
FIG. 14 shows withdrawal of the transport securing unit for removal from at least the rotor.

In a second second partial method step, the transport securing unit 18 is withdrawn and/or displaced starting from the unlocking position along the rotation axle 14, in particular in the axial direction 56, from the stator 16. In the present case, the first second partial method step, in the timeline of the method, is carried out prior to the second second partial method step. FIGS. 13a and 13b illustrate this displacement and/or withdrawal of the transport securing unit 18 starting from the unlocking position, in particular from the stator 16 along the rotation axle 14, in particular in the axial direction 56. An operator pulls and/or pushes the actuating element 32 along the rotation axle 14, in particular in the axial direction 56, in the second second partial method step.

Furthermore, after unlocking, the transport securing unit 18 is removable from the stator 16 and the rotor 12 in a direction perpendicular to the rotation axle 14. In a third second partial method step, the transport securing unit 18 is removed from the stator 16 and the rotor 12 in a direction at least essentially perpendicular to the rotation axle 14, in particular is pulled up (cf. FIG. 14). To do this, the transport securing unit 18 includes a guiding region 26 which extends outwardly from the receiving region 20 and enables guiding of the rotor 12 along the guiding region 26 towards the outside (cf. FIGS. 9 and 14). During removal of the transport securing unit 18 at least essentially perpendicular to the rotation axle 14, the rotor 12 glides and/or slides from the receiving region 20 along the guiding region 26.

Figure 15:
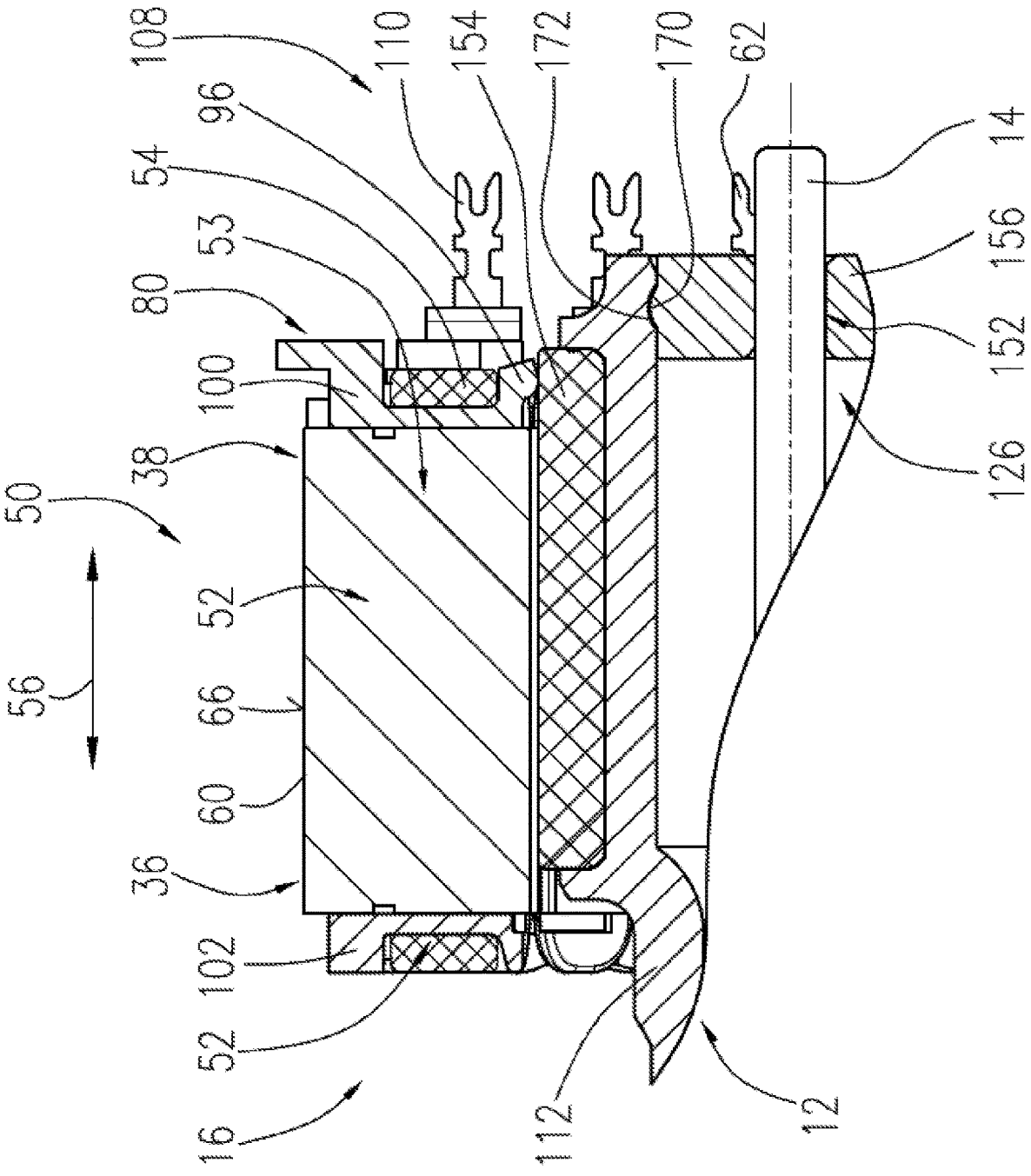
FIG. 15 shows a sectional view of the motor without transport securing unit, wherein the rotor is displaced relative to the stator along the rotation axle and is fixed with the stator to achieve transport securing.
Figures 16A, 16B:
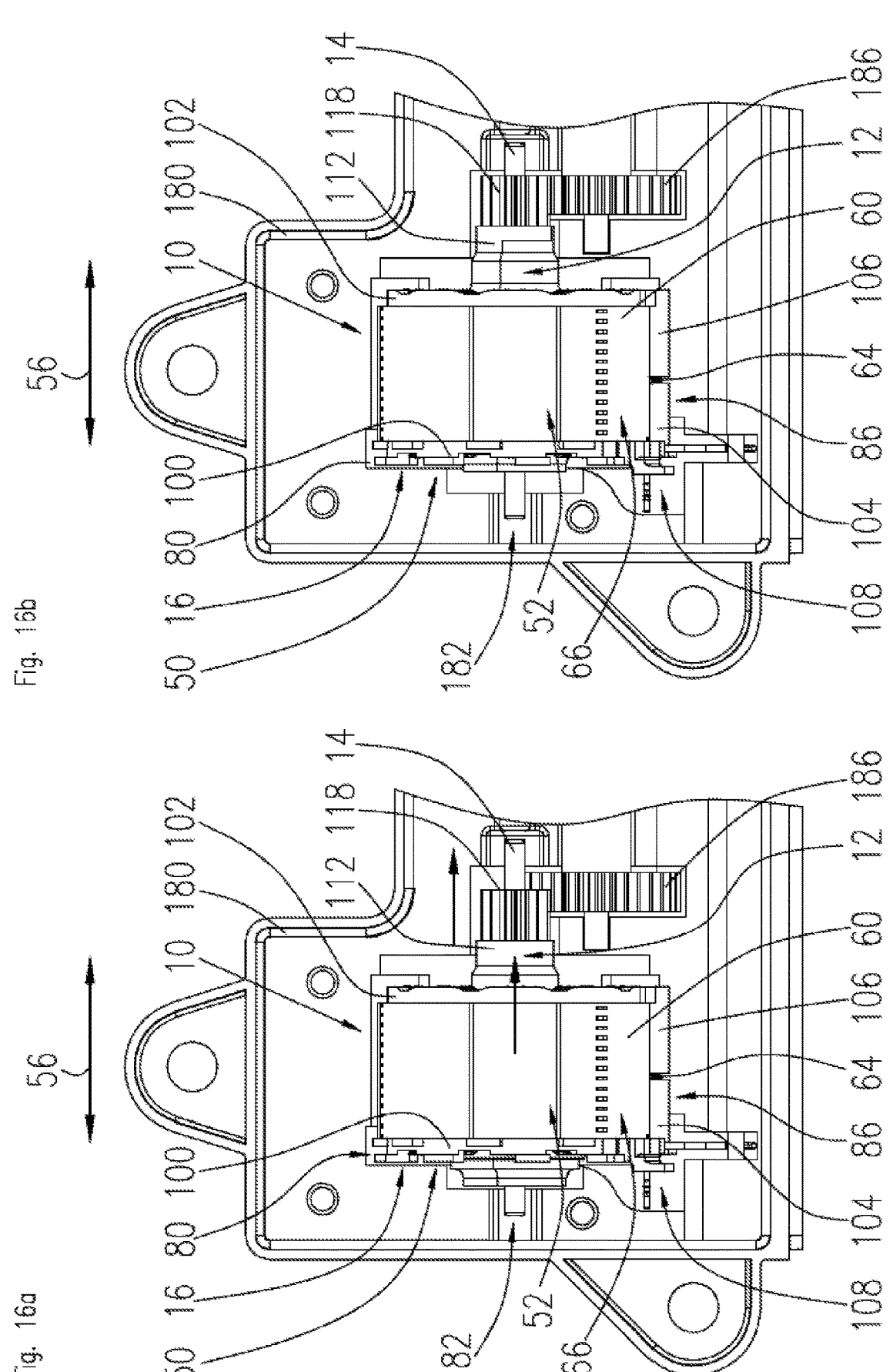
FIG. 16 shows a displacement of the rotor along the rotation axle to align and/or position the rotor relative to the stator and to release fixing of the rotor with the stator.

To provide a particularly efficient transport securing device, in the present embodiment, the rotor 12 is displaced relative to the stator 16 along the rotation axle 14 and contacts the stator 16 at least in portions in the circumferential direction to secure it against movement in the transportation state. The transport securing device, in the present case, thus comprises the transport securing unit 18 and the displacement of the rotor 12 relative to the stator 16. FIGS. 15 and 16a show the displaced state of the rotor 12 relative to the stator 16. In the transportation state, the stator 16 and the rotor 12, are fixed to each other at least in portions in the circumferential direction at least in a frictional manner. In the present case, the stator 16 and the rotor 12 are wedged against each other in the transport securing state. The rotor 12 is displaced along the rotation axle 14 relative to the stator 16 to such a degree that a stop nose 96 of the stator 16 contacts the rotor 12 and is bent by the displaced arrangement of the rotor 12. The stop nose 96, in the present case, is part of the first slot insulation element 100. The stop nose 96 is arranged on at least one of the stator teeth 53. In accordance with FIG. 15, the stop nose 96 contacts the magnet 154 of the rotor 12.

Figure 17:
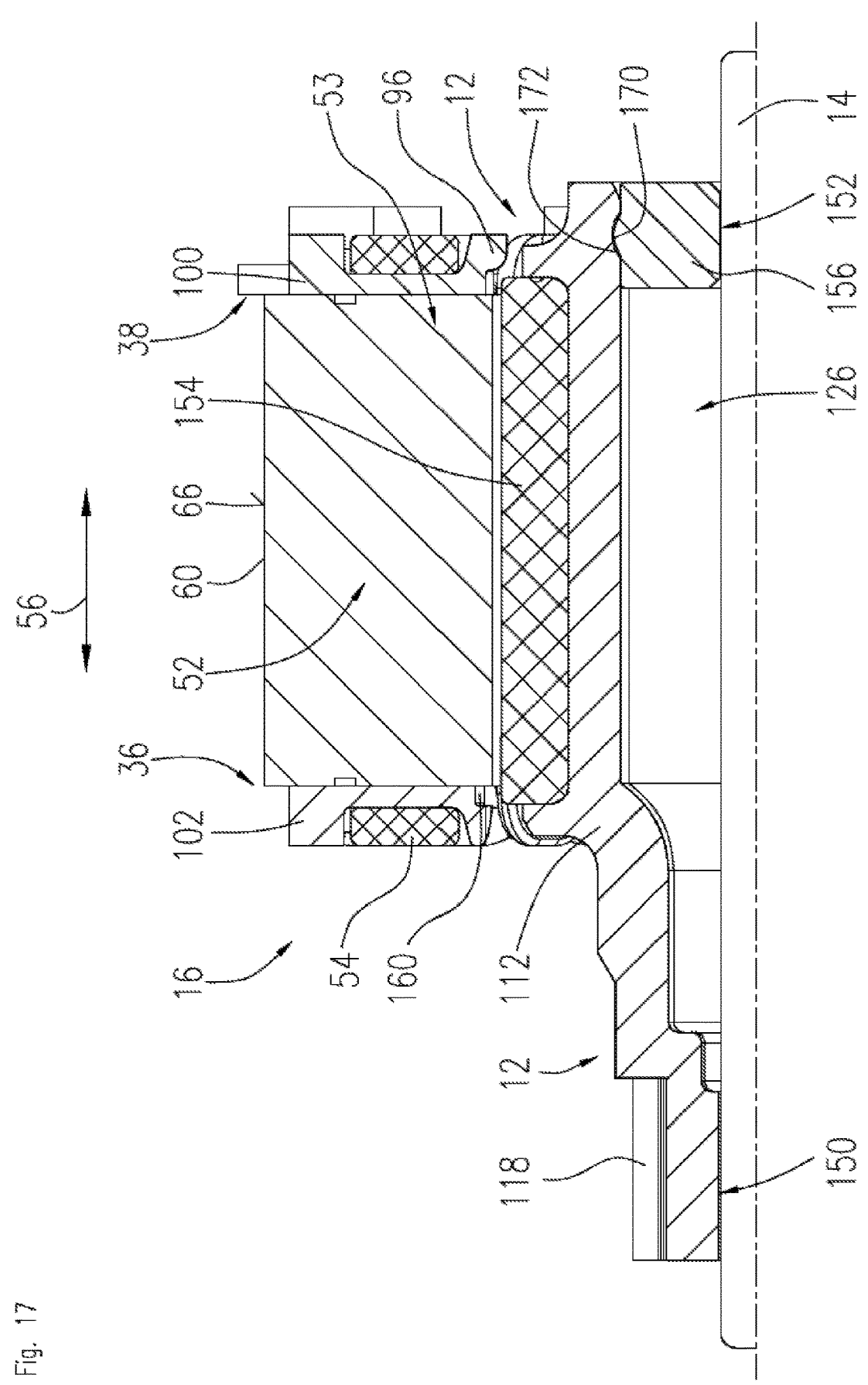
FIG. 17 shows a sectional view of the motor in an operating state without transport securing unit and non-displaced positioning of the rotor relative to the stator, or fixing of the rotor with the stator.

To release the rotor 12 from the fixed state on the stator 16, the rotor 12 is displaceable along the rotation axle 14 relative to the stator 16 for release from the transportation state. FIGS. 16*a* and 16*b* show a third method step of the above-mentioned method, in which the rotor 12 is displaced relative to the stator 16 along the rotation axle 14. The rotor 12 is displaceable along the rotation axle 14 to such a degree that the gear element 118 completely engages the external structural unit 186 and the magnet 154 of the rotor 12 is free of contact with the stop nose 96 (cf. FIGS. 16*b* and 17). FIG. 17 also illustrates that the magnet 154 is arranged in alignment with, in particular not displaced, with respect to the back iron element 60 in the operating state of the rotor 12. Furthermore, the magnet 154 is parallel with the back iron element 60 and beneath the back iron element 60 in a perpendicular view from above. The magnet 154 is centrally arranged with respect to the back iron element 60 in the operating state in accordance with FIG. 17. After removal of the transport securing unit 18 and positional correction of the rotor 12 relative to the stator 16, the motor apparatus 10, and thus the motor 50, is ready for operation.

LIST OF REFERENCE NUMERALS 10 motor apparatus
12 rotor
14 rotation axle
16 stator
18 transport securing unit
20 receiving region
26 guiding region
28 securing element
30 detent hook
32 actuating element
34 rim
36 end
38 end
50 motor
52 stator core
53 stator tooth
54 coil wire
56 axial direction
60 back iron element
62 earthing element
64 contact element
66 exterior circumferential surface
68 portion
70 coil spring
72 end face
74 end face
76 circumferential surface
78 pole shoe
80 slot insulation unit
82 support surface
84 normal direction
86 receiving channel
88 main extension direction
90 angle
92 retainer
96 stop nose
98 contact point
100 slot insulation element
102 slot insulation element
104 part
106 part
108 connecting device
110 connecting elements
112 base body
114 region 116 region
118 gear element
120 intermediate region
126 hollow space
128 extension
132 extension
134 region
136 distance
150 sliding contact point
152 sliding contact point
154 magnets
156 bearing element
160 opening
170 boss
172 recess
180 housing unit
182 bearing region
186 structural unit

The invention claimed is:

1. A motor apparatus, comprising
a rotation axle and
a rotor, which includes a base body and which is supported on the rotation axle in a first region and in at least one second region in a manner rotatable relative thereto,
wherein a gear element of the rotor is at least arranged in part in the first region,
wherein the rotor comprises a hollow space about the rotation axle in an intermediate region between the first region and the second region, and
wherein the rotor has a larger material thickness in the first region than in a third region directly adjacent to the first region.

2. The motor apparatus according to claim 1,
wherein, in the first region, the base body is supported on the rotation axle in a manner rotatable relative thereto and it is integrally formed with the gear element.

3. The motor apparatus according to claim 1,
wherein the base body is at least largely made of a plastic material.

4. The motor apparatus according to claim 1,
wherein the base body is formed as an injection molded part.

5. The motor apparatus according to claim 1,
wherein the base body has a plurality of regions in which a radial distance of the base body varies from the rotation axle.

6. The motor apparatus according to claim 1,
wherein an extension of the gear element along the rotation axle is larger than an extension of the first region along the rotation axle.

7. The motor apparatus according to claim 1,
wherein a first sliding contact point of the rotor with the rotation axle in the first region and a second sliding contact point of the rotor with the rotation axle in the second region are respectively made of a plastic material.

8. The motor apparatus according to claim 7,
wherein the rotor includes a bearing element, which is formed separately from the base body and which includes the second sliding contact point.

9. The motor apparatus according to claim 8,
wherein the bearing element is at least largely made of a plastic material.

10. The motor apparatus according to claim 8, wherein the base body and the bearing element are connected to each other at least in a form-fitting manner.

11. The motor apparatus according to claim 10, wherein, in an installed state, the bearing element is fixed on the base body in a pressure-resistant manner.

12. A motor, comprising the motor apparatus according to claim 7.

* * * * *